United States Patent
Kim et al.

(10) Patent No.: US 12,356,375 B2
(45) Date of Patent: Jul. 8, 2025

(54) METHOD AND APPARATUS FOR CONFIGURING BANDWIDTH PART IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Younsun Kim, Suwon-si (KR); Hyoungju Ji, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 17/773,737

(22) PCT Filed: Oct. 30, 2020

(86) PCT No.: PCT/KR2020/015050
§ 371 (c)(1),
(2) Date: May 2, 2022

(87) PCT Pub. No.: WO2021/086116
PCT Pub. Date: May 6, 2021

(65) Prior Publication Data
US 2022/0417916 A1   Dec. 29, 2022

(30) Foreign Application Priority Data
Nov. 1, 2019   (KR) ..................... 10-2019-0138777

(51) Int. Cl.
*H04W 72/044* (2023.01)
*H04L 5/00* (2006.01)
(Continued)

(52) U.S. Cl.
CPC ......... *H04W 72/044* (2013.01); *H04L 5/0098* (2013.01); *H04W 72/20* (2023.01); *H04W 72/53* (2023.01)

(58) Field of Classification Search
CPC ... H04W 72/044; H04W 72/20; H04W 72/53; H04W 48/12; H04W 72/0446;
(Continued)

(56) References Cited

U.S. PATENT DOCUMENTS

| 11,974,262 B2 | 4/2024 | Song et al. |
| 2018/0255586 A1 | 9/2018 | Einhaus et al. |

(Continued)

FOREIGN PATENT DOCUMENTS

| EP | 3 471 329 A1 | 4/2019 |
| KR | 10-2019-0013539 A | 2/2019 |

(Continued)

OTHER PUBLICATIONS

Qualcomm Incorporated, 'Cross-slot scheduling power saving techniques', R1-1909276, 3GPP TSG RAN WG1 #98, Prague, Czech Republic, Aug. 17, 2019.
(Continued)

*Primary Examiner* — Ian N Moore
*Assistant Examiner* — Latresa A McCallum
(74) *Attorney, Agent, or Firm* — Jefferson IP Law, LLP

(57) ABSTRACT

The disclosure relates to a method performed by a UE in a wireless communication system. A method performed by a UE in a wireless communication system according to an embodiment may include receiving resource configuration information in a time domain for UL or DL in a plurality of BWPs from a BS, receiving information about an activated BWP from the BS, determining a UL resource or a DL resource in the time domain corresponding to the activated BWP based on the resource configuration information and
(Continued)

the information about the activated BWP, and communicating with the BS based on the UL resource or the DL resource of the time domain corresponding to the activated BWP.

15 Claims, 17 Drawing Sheets

(51) Int. Cl.
*H04W 72/20* (2023.01)
*H04W 72/53* (2023.01)

(58) Field of Classification Search
CPC ........... H04W 72/0453; H04W 72/535; H04W 48/16; H04L 5/0098; H04L 5/0014; H04L 5/005; H04L 5/0078
See application file for complete search history.

(56) References Cited

U.S. PATENT DOCUMENTS

| | | |
|---|---|---|
| 2019/0132109 A1 | 5/2019 | Zhou et al. |
| 2019/0132862 A1 | 5/2019 | Jeon et al. |
| 2019/0140881 A1* | 5/2019 | Akkarakaran ...... H04L 27/2613 |
| 2019/0149380 A1 | 5/2019 | Babaei et al. |
| 2019/0149383 A1* | 5/2019 | Ko ......................... H04W 72/04 370/329 |
| 2019/0215212 A1* | 7/2019 | Park ...................... H04L 5/0007 |

FOREIGN PATENT DOCUMENTS

| | | | |
|---|---|---|---|
| KR | 10-2021-0040703 A | 4/2021 | |
| WO | WO-2019051177 A1 * | 3/2019 | ........... H04B 7/0602 |
| WO | 2019/139444 A1 | 7/2019 | |

OTHER PUBLICATIONS

Catt, 'Correction on time duration for active BWP change', R1-1910316, 3GPP TSG-RAN WG1 Meeting #98bis, Chongqing, China, Oct. 5, 2019.

International Search Report dated Feb. 9, 2021, issued in International Patent Application No. PCT/KR2020/015050.

Extended European Office Action dated Oct. 12, 2022, issued in European Patent Application No. 20881856.7.

European Notice of Allowance dated Sep. 16, 2024; European Application No. 20 881 856.7-1215.

Korean Office Action with English translation dated Feb. 7, 2025; Korean Appln. No. 10-2019-0138777.

* cited by examiner

METHOD AND APPARATUS FOR CONFIGURING BANDWIDTH PART IN WIRELESS COMMUNICATION SYSTEM

TECHNICAL FIELD

The disclosure relates to a method and apparatus for configuring a bandwidth part (BWP) in a wireless communication system.

BACKGROUND ART

To meet the ever-increasing demand with respect to wireless data traffic since the commercialization of the 4G communication system, there have been efforts to develop an advanced fifth generation (5G) system or pre-5G communication system. For this reason, the 5G or pre-5G communication system is also called a beyond 4th-generation (4G) network communication system or post long term evolution (LTE) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even application of a cloud radio access network (cloud RAN) as the aforementioned big data processing technology may be an example of convergence of 5G and IoT technologies.

DISCLOSURE

Technical Solution

A technical objective of the disclosure is to provide a method and apparatus for configuring a bandwidth part (BWP) resource for efficient uplink or downlink transmission or reception for various services in a mobile communication system.

Advantageous Effects

Embodiments of the disclosure provide a method and apparatus for configuring a bandwidth part (BWP) resource for efficient uplink or downlink transmission or reception in a mobile communication system.

BEST MODE

Figure 1:
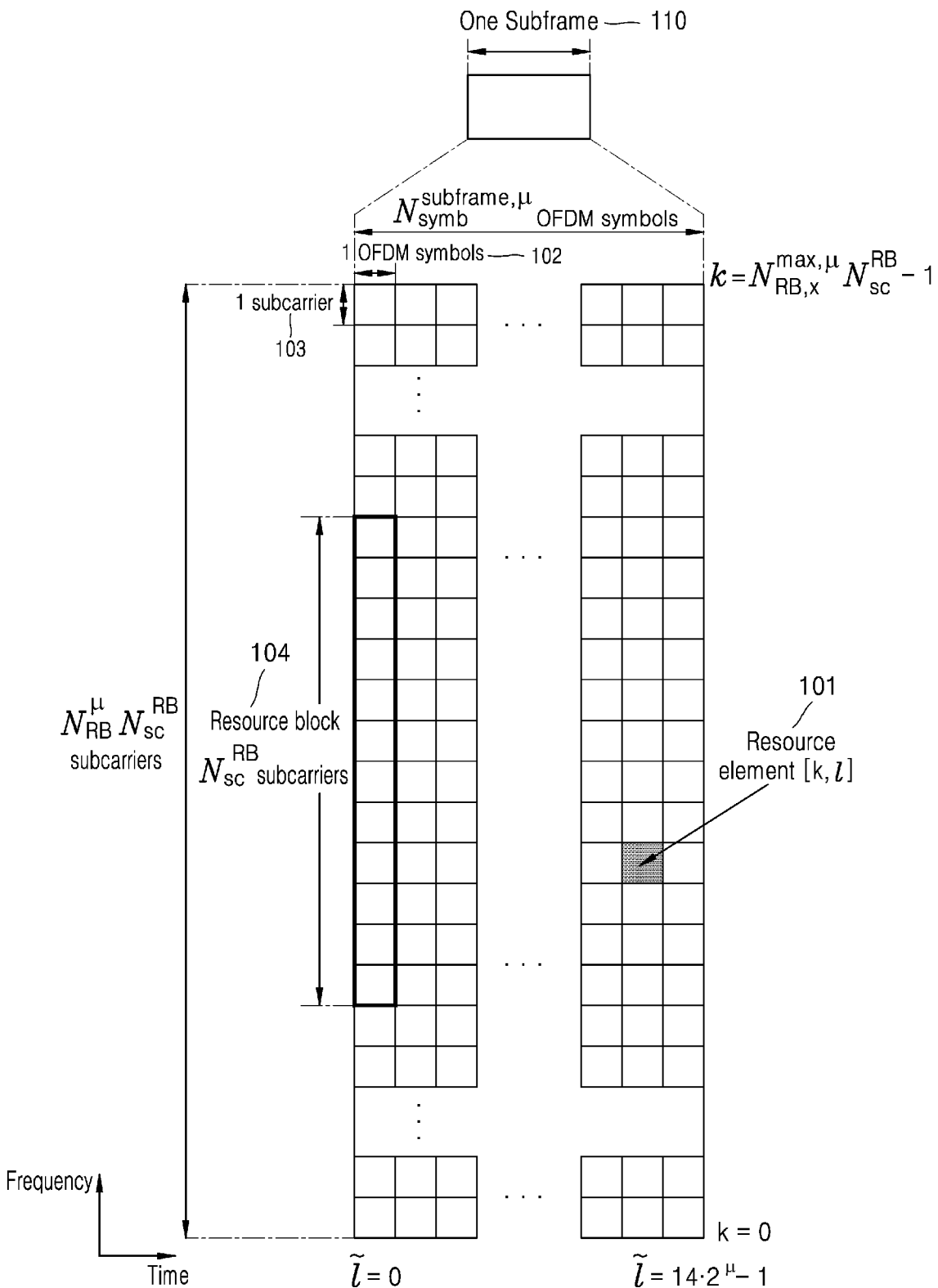
FIG. 1 illustrates a basic structure of time-frequency domain, which is a radio resource domain of a fifth generation (5G) system, according to an embodiment of the disclosure.

According to an embodiment of the disclosure, a method performed by a user equipment (UE) in a wireless communication system includes receiving resource configuration information in a time domain for an uplink (UL) or a downlink (DL) in a plurality of bandwidth parts (BWPs) from a base station (BS), receiving information about an activated BWP from the BS, determining a UL resource or a DL resource in the time domain corresponding to the activated BWP based on the resource configuration information and the information about the activated BWP, and communicating with the BS based on the UL resource or the DL resource of the time domain corresponding to the activated BWP.

According to an embodiment of the disclosure, a method performed by a BS in a wireless communication system includes transmitting resource configuration information in a time domain for UL or DL in a plurality of bandwidth parts (BWPs) to a UE, transmitting information about an activated BWP to the UE, and communicating with the UE based on a UL resource or a DL resource in the time domain corresponding to the activated BWP determined according to the resource configuration information and the information about the activated BWP.

MODE FOR INVENTION

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. In the drawings, the same or corresponding elements are denoted by the same reference numerals.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS. Although the following embodiments will focus on the long term evolution (LTE) or LTE-Advanced (LTE-A) system as an example, they may be applied to other communication systems with similar technical backgrounds or channel types. For example, the 5th generation (5G) mobile communication technologies developed since the LTE-A, such as the 5G new radio (NR) may be included in the systems to which the embodiments of the disclosure will be applied, and the term '5G' as herein used may be a concept including the existing LTE, LTE-A, or other similar services. Furthermore, embodiments of the disclosure will also be applied to different communication systems with some modifications to such an extent that does not significantly deviate the scope of the disclosure when judged by skilled people in the art.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, such that the instructions stored in the computer-executable or computer-readable memory may manufacture a product that contains instruction means for performing functions described in the block(s) of the flowchart. The computer program instructions may also be loaded on computers or programmable data processing equipment, so it is possible for the instructions to generate a process to be executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions.

However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Embodiments of the disclosure will now be described in detail with reference to the accompanying drawings. A method and apparatus proposed in the embodiments of the disclosure are described by taking an example of a service to enhance coverage, without being limited thereto, and a combination of all or some of one or more embodiments of the disclosure may be used for a method of transmitting or receiving a data channel, a control channel or a reference signal corresponding to an additional service. Furthermore, the embodiments of the disclosure will also be applied through some modifications to an extent that does not significantly deviate from the scope of the disclosure when judged by those of ordinary skill in the art.

In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Wireless communication systems are evolving from early systems that provide voice-oriented services to broadband wireless communication systems that provide high data rate and high quality packet data services such as third generation partnership project (3GPP) high speed packet access (HSPA), LTE or evolved universal terrestrial radio access (E-UTRA), LTE-A, LTE-Pro, 3GPP2 high rate packet data (HRPD), ultra-mobile broadband (UMB), and IEEE 802.16e communication standards.

As a representative example of such a broadband wireless communication system, an LTE system adopts orthogonal frequency division multiplexing (OFDM) for DL and single carrier frequency division multiple access (SC-FDMA) for UL. The UL refers to a radio link for a UE or MS to transmit data or a control signal to an eNode B (eNB) or BS, and the DL refers to a radio link for a BS to transmit data or a control signal to a UE or MS. Such a multiple-access scheme allocates and operates time-frequency resources for carrying data or control information for respective users not to overlap each other, i.e., to maintain orthogonality, thereby identifying each user's data or control information.

The 5G communication system that is a communication system since the LTE, needs to support services that simultaneously meet various demands to freely reflect the various demands from users and service providers. The services considered for the 5G communication system may include enhanced mobile broadband (eMBB), massive machine type communication (mMTC), ultra-reliability low latency communication (URLLC), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in light of a single BS. Furthermore, the 5G communication system needs to provide increasing user perceived data rate while providing the peak data rate. To satisfy these requirements, enhancement of various technologies for transmission or reception including multiple-input multiple-output (MIMO) transmission technologies may be required. While the LTE system uses a maximum of 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

A bandwidth part (BWP) technology for the BS to divide the entire carrier frequency band into multiple frequency bands that may be served by respective UEs when the BS supports wideband frequencies. In other words, when the BS supports a BWP and a particular UE has a small BW capability, the BS may provide a small frequency band for the UE through the BWP and may reduce energy consumption of the UE by reducing the frequency band through BWP switching. In addition, it has an effect of being able to support various services without latency to one UE through BWP switching while providing a different frame structure to each of multiple BWPs. The BWP technology may be applied to a one-to-one control channel or data channel between a certain UE and the BS. Furthermore, the BS may apply it for reducing energy of the BS by transmitting a control channel and a data channel for transmitting a common signal to be transmitted to multiple UEs in the system, e.g., a synchronization signal, a physical broadcast channel (PBCH) or system information, only in a configured BWP.

At the same time, in the 5G communication system, mMTC is considered to support an application service such as the Internet of Things (IoT). In order for the mMTC to provide the IoT efficiently, support for access from massive number of UEs in a cell, enhanced coverage of the terminal, extended battery time, cost reduction of the terminal, etc., are required. Because the IoT is equipped in various sensors and devices to provide communication functions, it may be supposed to support a large number of UEs in a cell (e.g., 1,000,000 terminals/km$^2$). Furthermore, a UE supporting the mMTC is more likely to be located in a shadow area, such as basement of a building, which might not be covered by a cell by the nature of the service, so the mMTC requires an even larger coverage than expected for other services provided by the 5G communication system. The UE supporting the mMTC needs to be a low-cost UE, and requires quite long battery life time such as 10 to 15 years because the battery in the UE is hard to be changed frequently.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLCC services may need to satisfy sub-millisecond (less than 0.5 millisecond) air interface latency and simultaneously require a packet error rate equal to or lower than $10^{-5}$. Hence, for the URLLC services, the 5G system needs to provide a smaller transmit time interval (TTI) than for other services, and simultaneously needs to allocate a wide range of resources for a frequency band to secure reliability of the communication link.

Those three services of the 5G communication system (hereinafter, interchangeably used with the 5G system), i.e., eMBB, URLLC, and mMTC, may be multiplexed and transmitted from a single system. In this case, to meet different requirements for the three services, different transmission or reception schemes and parameters may be used between the services.

A frame structure in a 5G system will now be described in more detail with reference to the accompanying drawings.

FIG. 1 illustrates a basic structure of time-frequency domain, which is a radio resource domain of a 5G system, according to an embodiment of the disclosure.

In FIG. 1, the horizontal axis represents a time domain, and the vertical axis represents a frequency domain. A basic resource unit in the time and frequency domain is a resource element (RE) 101, which may be defined as an orthogonal frequency division multiplexing (OFDM) symbol or discrete Fourier transform spread OFDM (DFT-s-OFDM) 102 in the time domain and a subcarrier 103 on the frequency domain. In the frequency domain, $N_{sc}^{RB}$ (e.g., 12) consecutive REs may constitute a single resource block (RB) 104. In the time domain, $N_{symb}^{subframe}$ consecutive OFDM symbols may constitute a single subframe 110.

Figure 2:
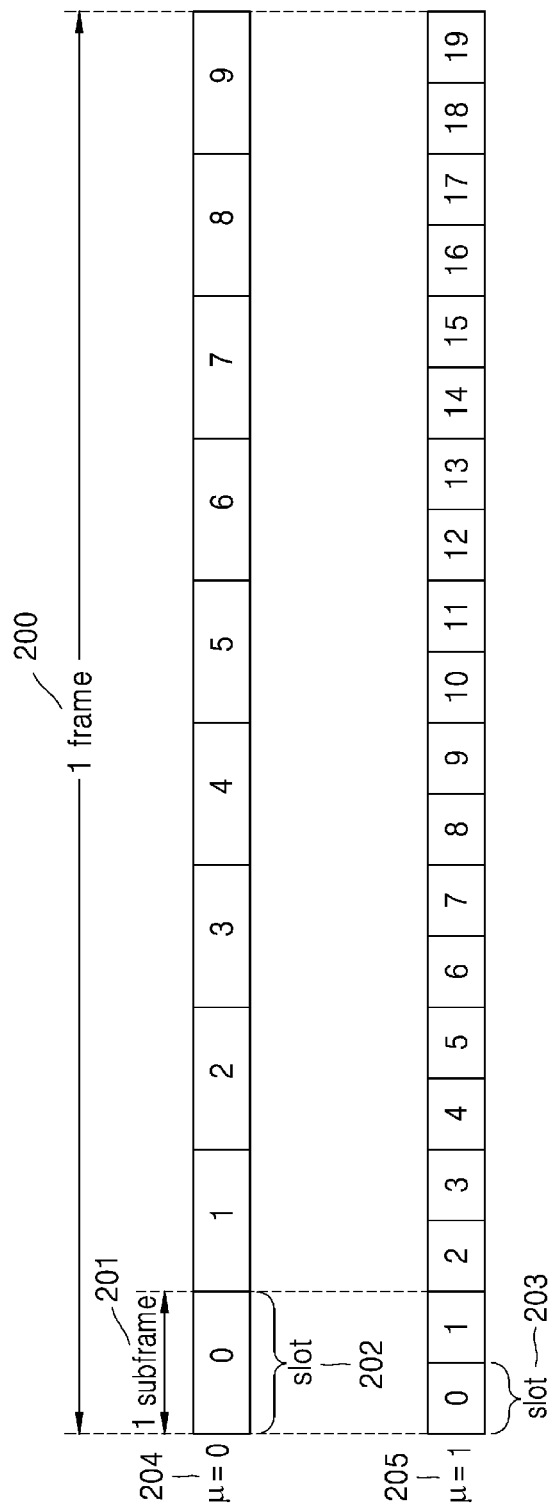
FIG. 2 illustrates a slot structure considered in a 5G system, according to an embodiment of the disclosure.

FIG. 2 illustrates a slot structure considered in a 5G system, according to an embodiment of the disclosure.

In FIG. 2, an example of structures of a frame 200, a subframe 201 and a slot 202 are shown. The one frame 200 may be defined to be 10 ms long. The one subframe 201 may be defined to be 1 ms, and thus a total of 10 subframes 201 may constitute the one frame 200. The one slot 202 or 203 may be defined to have 14 OFDM symbols (i.e., the number of symbols per 1 slot ($N_{symb}^{slot}$)=14). The one subframe 201 may include one or multiple slots 202 and 203, and the number of slots 202 and 203 per one subframe may vary depending on subcarrier spacing configuration values μ 204 or 205.

In the example of FIG. 2, slot structures are shown in cases of the subcarrier spacing configuration values being 0 and 1, i.e., μ=0 (204) and μ=1 (205), respectively. In the case of μ=0 (204), the one subframe 201 includes one slot 202, and in the case of μ=1 (205), the one subframe 201 includes two slots 203. That is, depending on the subcarrier spacing configuration value μ, the number of slots per one subframe ($N_{slot}^{subframe,\mu}$) may vary and the number of slots per one frame ($N_{slot}^{frame,\mu}$) may vary accordingly. $N_{slot}^{subframe,\mu}$ and $N_{slot}^{frame,\mu}$ depending on the subcarrier spacing configuration value μ may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, synchronization signal block (SSB) (interchangeably used with SS block, SS/PBCH block, etc.) may be transmitted for initial access, and the SSB may include a primary synchronization signal (PSS), a secondary synchronization signal (SSS), and a physical broadcast channel (PBCH). In an initial access step in which the UE accesses the system for the first time, the UE may first obtain DL time and frequency domain synchronization from a synchronization signal through cell search and then obtain a cell identity (ID). The synchronization signal may include a PSS and an SSS. The UE may then receive a PBCH that carries a master information block (MIB) from the BS to obtain transmission or reception related system information such as system bandwidth or associated control information, and basic parameter values. Based on this information, the UE may obtain a system information block (SIB) by decoding a physical downlink control channel (PDCCH) and a physical downlink shared channel (PDSCH). After this, the UE exchanges IDs with the BS through a random access operation, and makes initial access to the network through operations of registration, authentication, etc.

An initial cell access operation procedure of a 5G communication system will now be described in more detail with reference to the accompanying drawings.

The synchronization signal is a signal to be a reference for cell search and may be transmitted with subcarrier spacing applied thereto, which is suitable to a channel condition such as phase noise for each frequency band. A 5G BS may transmit multiple synchronization signal blocks based on the number of analog beams intended for operation. The PSS and the SSS may be mapped and transmitted over 12 RBs, and the PBCH may be mapped and transmitted over 24 RBs. A structure in which the synchronization signal and the PBCH are transmitted in the 5G communication system will now be described.

Figure 3:
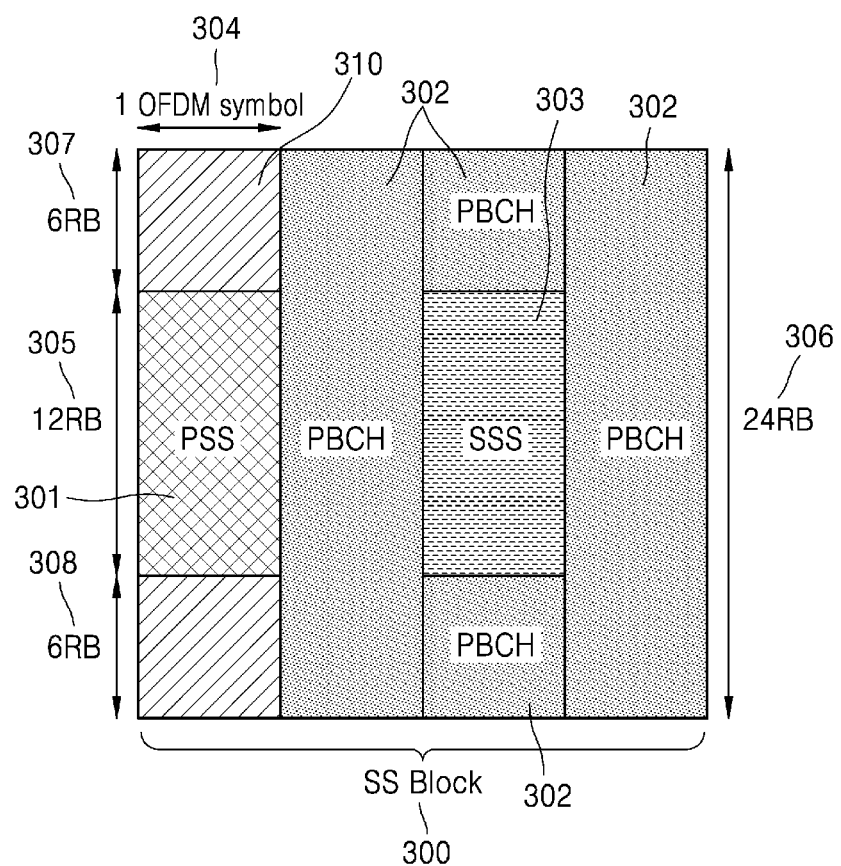
FIG. 3 illustrates a synchronization signal block considered in a 5G communication system, according to an embodiment of the disclosure.

FIG. 3 illustrates an SSB considered in a 5G communication system.

In FIG. 3, an SSB 300 may be comprised of a PSS 301, an SSS 303, and a PBCH 302.

As illustrated, the SSB 300 may be mapped to four OFDM symbols 304 in the time domain. The PSS 301 and the SSS 303 may be transmitted in 12 RBs 305 in the frequency domain, and first and third OFDM symbols, respectively, in the time domain. In the 5G system, a total of 1008 different cell IDs may be defined, and the PSS 301 may have three different values based on the cell's physical layer ID and the SSS 303 may have 336 different values. Upon detection of the PSS 301 and the SSS 303, the UE may obtain one of 1008 cell IDs as a combination of the PSS 301 and the SSS 303. The cell ID obtained by the UE may be expressed in Equation 1 below:

$$N_{ID}^{cell}=3N_{ID}^{(1)}+N_{ID}^{(2)} \quad \text{Equation 1}$$

In Equation 1, $N_{ID}^{(1)}$ may be estimated from the SSS 303, and may have a value between 0 to 335. $N_{ID}^{(2)}$ may be estimated from the PSS 301, and may have a value between 0 to 2. The cell ID $N_{ID}^{cell}$ may be estimated in a combination of $N_{ID}^{(1)}$ and $N_{ID}^{(2)}$.

The PBCH 302 may be transmitted on resources including 24 RBs 306 in the frequency domain and 6 RBs 307 and 308 on either side of the second to fourth OFDM symbols of the SSB in the time domain while the SSS 303 is transmitted in the middle 12 RBs. Various system information called an MIB may be transmitted in the PBCH 302, and more particularly, the MIB may include information as in Table 2 below and a PBCH payload and a PBCH demodulation reference signal (DMRS) may include additional information as will be described at a later time.

TABLE 2

```
MIB ::=                        SEQUENCE {
   systemFrameNumber              BIT STRING (SIZE (6)),
   subCarrierSpacingCommon        ENUMERATED {scs15or60,
scs30or120},
   ssb-SubcarrierOffset           INTEGER (0..15),
   dmrs-TypeA-Position               ENUMERATED {pos2, pos3},
   pdcch-ConfigSIB1                  PDCCH-ConfigSIB1,
   cellBarred                     ENUMERATED {barred, notBarred},
   intraFreqReselection           ENUMERATED {allowed, notAllowed},
   spare                             BIT STRING (SIZE (1))
}
```

SSB information: an offset in the frequency domain of the SSB is indicated in four bits (ssb-SubcarrierOffset) in the MIB. An index of the SSB included in the PBCH may be indirectly obtained through decoding of the PBCH DMRS and the PBCH. Specifically, three bits obtained by decoding the PBCH DMRS may indicate an SSB index in a frequency band below 6 GHz, and three bits obtained by decoding the PBCH DMRS and three bits included in the PBCH payload and obtained by PBCH decoding, i.e., a total of six bits, may indicate an SSB index in a frequency band above 6 GHz.

PDCCH information: SCS in a common DL control channel may be indicated in one bit (subCarrierSpacingCommon) in the MIB, and time-frequency resource configuration information of a control resource set (CORESET) and a search space (SS) may be indicated in eight bits (pdcch-ConfigSIB1).

system frame number (SFN): six bits (systemFrameNumber) in the MIB are used to indicate part of the SFN. Four bits of least significant bits (LSBs) of the SFN may be included in the PBCH payload, and the UE may indirectly obtain four bits of the LSBs of the SFN through PBCH decoding.

timing information in a radio frame: the UE may indirectly check from the aforementioned SSB index and one bit included in the PBCH payload and obtained by PBCH decoding whether the SSB has been transmitted in the first or second half frame of the radio frame.

As transmission bandwidth, 12 RBs, 305 of the PSS 301 and the SSS 303 and transmission bandwidth, 24 RBs, 306 of the PBCH 302 are different, there are six RBs on either side 307 and 308 in the first OFDM symbol aside from twelve RBs in the middle where the PSS 301 is transmitted, which may be used to transmit other signals or emptied.

The SSB may all be transmitted by using the same analog beam. That is, the PSS 301, the SSS 303, and the PBCH 302 may all be transmitted in the same beam. An analog beam has characteristics of not being applied differently in the frequency domain, and in all RBs in the frequency domain in a particular OFDM symbol in which a particular analog beam is applied, the same analog beam is applied. That is, four OFDM symbols in which the PSS 301, the SSS 303, and the PBCH 302 are transmitted may all be transmitted in the same analog beam.

Figure 4:
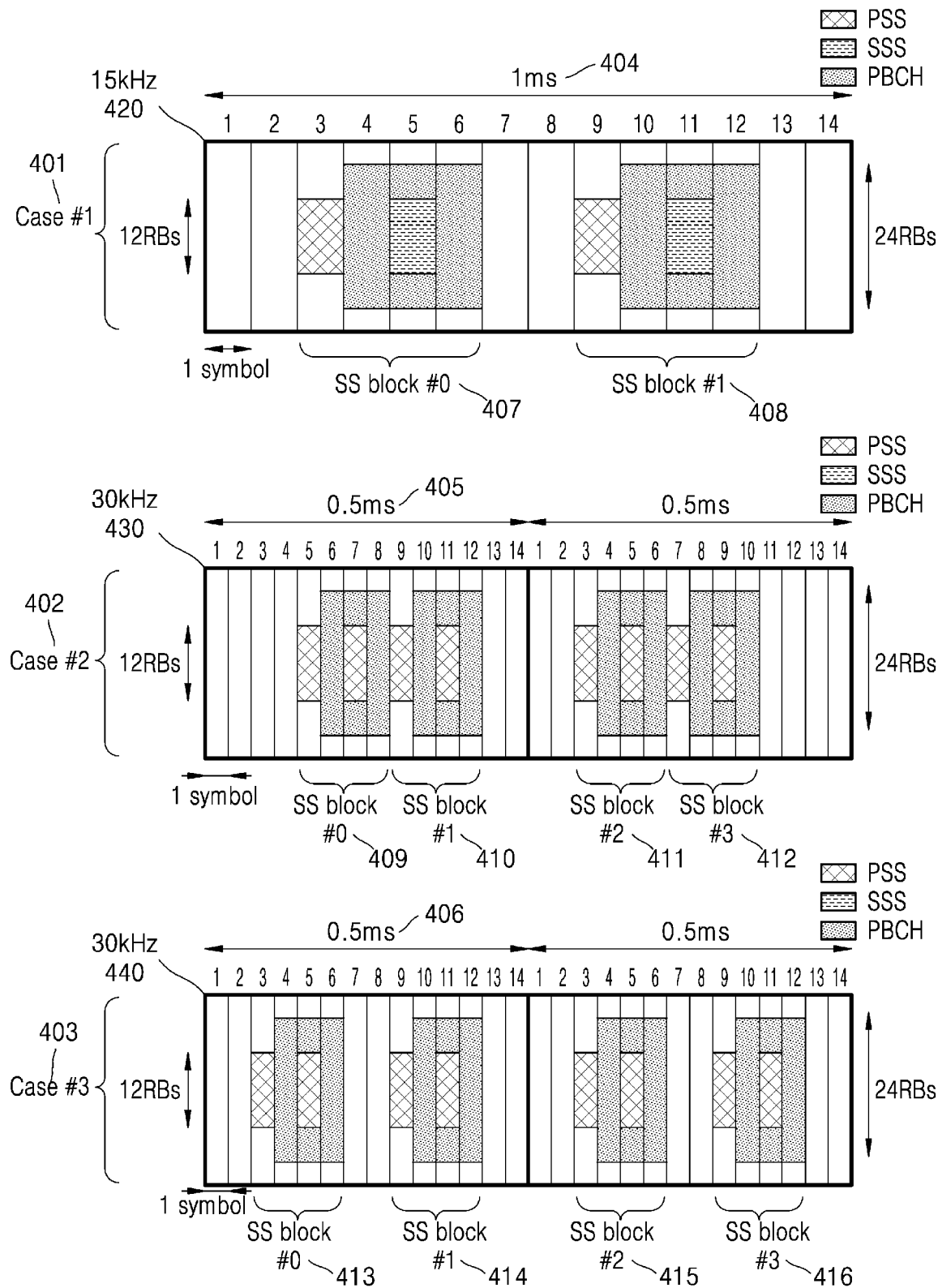
FIG. 4 illustrates cases where synchronization signal blocks are transmitted in frequency bands below 6 GHz considered in a 5G communication system, according to an embodiment of the disclosure.

FIG. 4 illustrates cases where SSBs are transmitted in a frequency band below 6 GHz considered in a 5G communication system.

Referring to FIG. 4, subcarrier spacing (SCS) of 15 kHz 420 and SCS of 30 kHz 430 and 440 may be used for SSB transmission in frequency bands below 6 GHz in the 5G communication system. A transmission case, case #1 401 for the SSB may have 15 kHz SCS, and two transmission cases, case #2 402 and case #3 403 for the SSB may have 30 kHz SCS.

In case #1 401 with the SCS of 15 kHz 420, up to two SSBs may be transmitted in a time of 1 ms 404 (corresponding to a length of one slot when the one slot is comprised of 14 OFDM symbols). In the example of FIG. 4, SSB #0 407 and SSB #1 408 are illustrated. In this case, SSB #0 407 may be mapped to four consecutive symbols from the third OFDM symbol, and SSB #1 408 may be mapped to four consecutive symbols starting from the ninth OFDM symbol.

Different analog beams may be applied to SSB #0 407 and SSB #1 408. Accordingly, a beam may be applied to all of the third to sixth OFDM symbols to which SSB #0 407 is mapped, and another beam may be applied to all of the ninth to twelfth OFDM symbols to which SSB #1 408 is mapped. Which beam is to be used for 7-th, 8-th, 13-th, and 14-th OFDM symbols to which no SSB is mapped may be freely determined by the BS.

In case #2 402 with the SCS of 30 kHz 430, up to two SSBs may be transmitted in a time of 0.5 ms 405 (corresponding to a length of one slot when the one slot is comprised of 14 OFDM symbols), and accordingly, up to four SSBs may be transmitted in a time of 1 ms (corresponding to a length of two slots when the one slot is comprised of 14 OFDM symbols). In the example of FIG. 4, illustrated is an occasion when SSB #0 409, SSB #1 410, SSB #2 411, and SSB #3 412 are transmitted in 1 ms (i.e., in two slots). In this case, the SSB #0 409 and the SSB #1 410 may be mapped from the fifth OFDM symbol and the ninth OFDM symbol of the first slot, respectively, and the SSB #2 411 and the SSB #3 412 may be mapped from the third OFDM symbol and the seventh OFDM symbol of the second slot, respectively.

Different analog beams may be applied to the SSB #0 409, the SSB #1 410, the SSB #2 411, and the SSB #3 412. In other words, an identical analog beam may be applied to the fifth to eighth OFDM symbols of the first slot in which the SSB #0 409 is transmitted, another identical analog beam may be applied to the ninth to twelfth OFDM symbols of the first slot in which the SSB #1 410 is transmitted, another identical analog beam may be applied to the third to sixth OFDM symbols of the second slot in which the SSB #3 411 is transmitted, and another identical analog beam may be applied to the seventh to tenth OFDM symbols of the second slot in which the SSB #3 412 is transmitted may be applied. Which beam is to be used for OFDM symbols to which no SSB is mapped may be freely determined by the BS.

In case #3 403 with the SCS of 30 kHz 440, up to two SSBs may be transmitted in a time of 0.5 ms 406 (corresponding to a length of one slot when the one slot is comprised of 14 OFDM symbols), and accordingly, up to four SSBs may be transmitted in a time of 1 ms (corresponding to a length of two slots when the one slot is comprised of 14 OFDM symbols). In the example of FIG. 4, illustrated are SSB #0 413, SSB #1 414, SSB #2 415, and SSB #3 416 transmitted in 1 ms (i.e., in two slots). In this case, the SSB #0 413 and the SSB #1 414 may be mapped from the third OFDM symbol and the ninth OFDM symbol of the first slot, respectively, and the SSB #2 415 and the SSB #3 416 may be mapped from the third OFDM symbol and the ninth OFDM symbol of the second slot, respectively.

Different analog beams may be used for the SSB #0 413, the SSB #1 414, the SSB #2 415, and the SSB #3 416. As described above, an identical beam may be used in four OFDM symbols in which each SSB is transmitted, and which beam is to be used in OFDM symbols to which no SSB is mapped may be freely determined by the BS.

Figure 5:
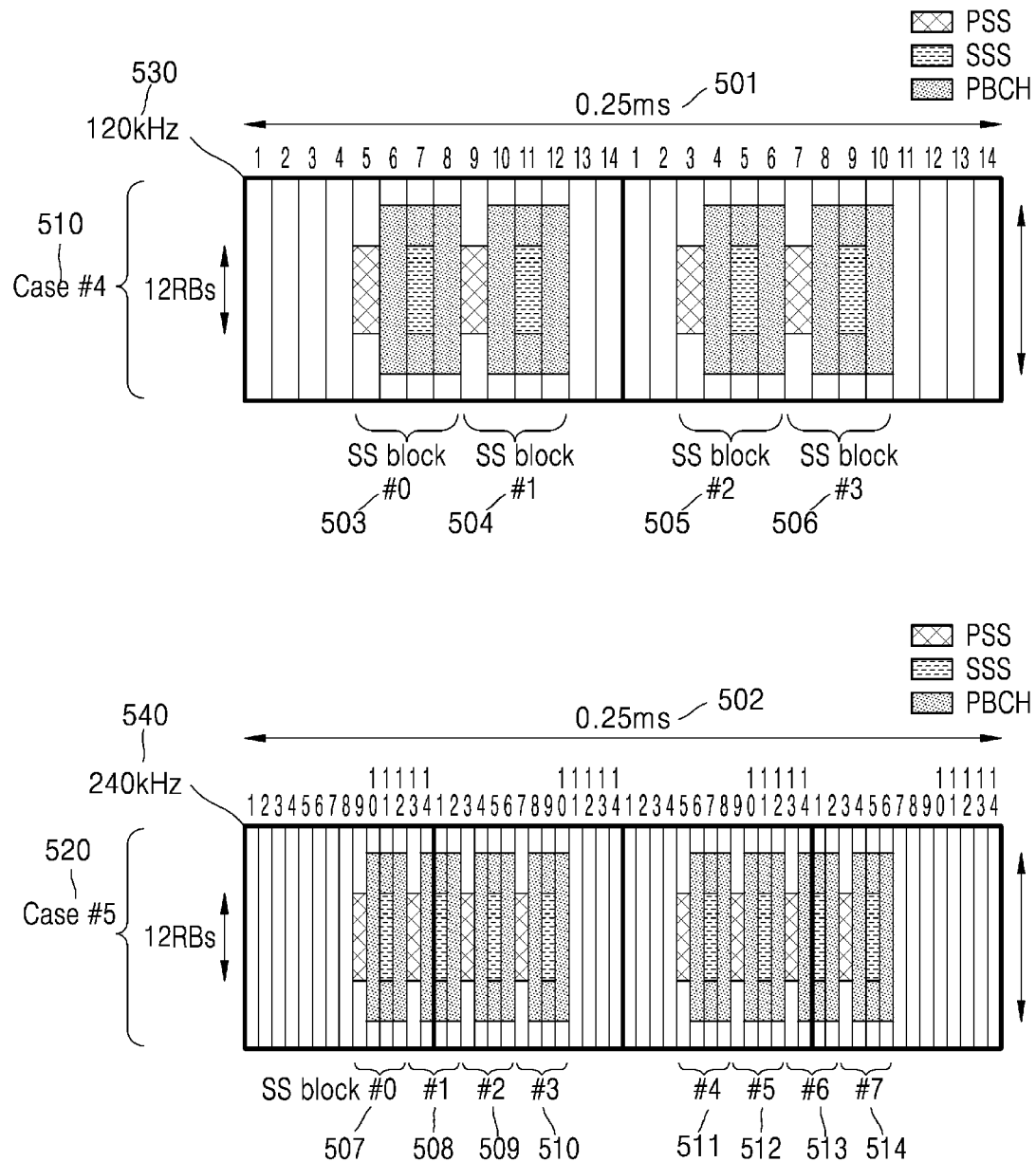
FIG. 5 illustrates cases where synchronization signal blocks are transmitted in frequency bands above 6 GHz considered in a 5G communication system, according to an embodiment of the disclosure.

FIG. 5 illustrates cases where SSBs are transmitted in frequency bands above 6 GHz considered in a 5G communication system.

Referring to FIG. 5, SCS of 120 kHz 530 and SCS of 240 kHz 540 may be used for SSB transmission in frequency bands above 6 GHz in the 5G communication system.

In case #4 510 with the SCS of 120 kHz 530, up to four SSBs may be transmitted in a time of 0.25 ms 501 (corresponding to a length of two slots when the one slot is comprised of 14 OFDM symbols). In the example of FIG. 5, illustrated is an occasion when SSB #0 503, SSB #1 504, SSB #2 505, and SSB #3 506 are transmitted in 0.25 ms (i.e., in two slots). In this case, the SSB #0 503 and the SSB #1 504 may be mapped from the fifth OFDM symbol and the ninth OFDM symbol of the first slot, respectively, and the SSB #2 505 and the SSB #3 506 may be mapped from the third OFDM symbol and the seventh OFDM symbol of the second slot, respectively.

In the same way as described above, different analog beams may be used for the SSB #0 503, the SSB #1 504, the SSB #2 505, and the SSB #3 506. An identical beam may be used in four OFDM symbols in which each SSB is transmitted, and which beam is to be used in OFDM symbols to which no SSB is mapped may be freely determined by the BS.

In case #5 520 with the SCS of 240 kHz 540, up to 8 SSBs may be transmitted in a time of 0.25 ms 502 (corresponding to a length of four slots when one slot is comprised of 14 OFDM symbols). In the example of FIG. 5, illustrated is an occasion when SSB #0 507, SSB #1 508, SSB #2 509, SSB #3 510, SSB #4 511, SSB #5 512, SSB #6 513, and SSB #7 514 are transmitted in 0.25 ms (i.e., in four slots). In this case, the SSB #0 507 and the SSB #1 508 may be mapped to the ninth OFDM symbol and the thirteenth OFDM symbol of the first slot, respectively, the SSB #2 509 and the SSB #3 510 may be mapped to the third OFDM symbol and the seventh OFDM symbol of the second slot, the SSB #4 511, the SSB #5 512, and the SSB #6 513 may be mapped to the fifth OFDM symbol, ninth OFDM symbol, and the thirteenth OFDM symbol of the third slot, respectively, and the SSB #7 514 may be mapped to the third OFDM symbol of the fourth slot.

In the same way as described above, different analog beams may be used for the SSB #0 507, the SSB #1 508, the SSB #2 509, the SSB #3 510, the SSB #4 511, the SSB #5 512, the SSB #6 513, and the SSB #7 514. An identical beam may be used in four OFDM symbols in which each SSB is transmitted, and which beam is to be used in OFDM symbols to which no SSB is mapped may be freely determined by the BS.

Figure 6:
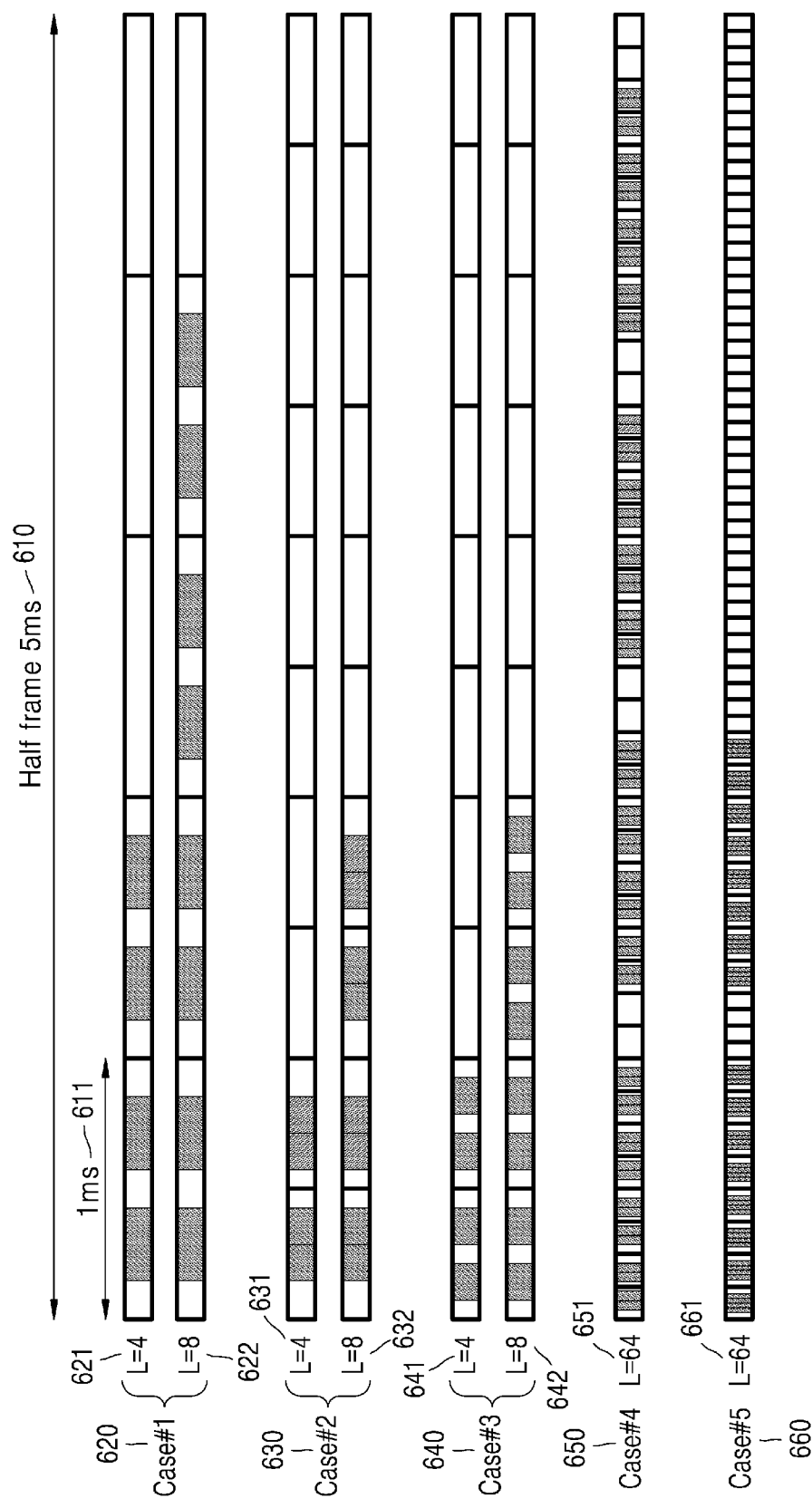
FIG. 6 illustrates cases where synchronization signal blocks are transmitted with subcarrier spacing of less than 5 ms, according to an embodiment of the disclosure.

FIG. 6 illustrates cases where SSBs are transmitted with SCS of less than 5 ms. In the 5G communication system, SSBs may be periodically transmitted at an interval of 5 ms (corresponding to five frames or a half frame 610).

In a frequency band below 3 GHz, up to four SSBs may be transmitted in the time of 5 ms 610. In a frequency band above 3 GHz and below 6 GHz, up to eight may be transmitted. In a frequency band above 6 GHz, up to sixty four may be transmitted. As described above, 15 kHz and 30 kHz of SCS may be used at frequencies below 6 GHz.

In an example of FIG. 6, as case #1 401 with 15 kHz of SCS comprised of one slot of FIG. 4 may be mapped to the first slot and the second slot in the frequency band below 3 GHz, up to four 621 may be transmitted, and as it may be mapped to the first, second, third, and fourth slots in the frequency band above 3 GHz and below 6 GHz, up to eight 622 may be transmitted. As case #2 402 or case #3 403 with 30 kHz of SCS comprised of two slots of FIG. 4 may start to be mapped from the first slot in the frequency band below 3 GHz, up to four 631 and 641 may be transmitted, and as it may start to be mapped from the first and third slots in the frequency band above 3 GHz and below 6 GHz, up to eight 632 and 642 may be transmitted.

120 kHz and 240 kHz of SCS may be used in the frequency band above 6 GHz. In an example of FIG. 6, as case #4 510 with 120 kHZ of SCS comprised of two slots of FIG. 5 may start to be mapped from 1st, 3rd, 5th, 7th, 11th, 13th, 15th, 17th, 21st, 23rd, 25th, 27th, 31st, 33rd, 35th and 37th slots in the frequency band above 6 GHz, up to 64 651 may be transmitted. In an example of FIG. 6, as case #5 520 with 240 kHZ of SCS comprised of four slots of FIG. 5 may start to be mapped from 1st, 5th, 9th, 13th, 21st, 25th, 29th, and 33rd slots in the frequency band above 6 GHz, up to 64 661 may be transmitted.

SSB indication information included in the system and actually transmitted will now be described in detail with reference to FIG. 7. As described above, the SSB indication information actually transmitted may be obtained from system information called an SIB, or obtained even through higher layer signaling. The SSB indication information included in the system information and actually transmitted may be indicated in 8 bits to represent whether up to eight SSBs are transmitted in the frequency band below 6 GHz, and may be indicated in a total of 16 bits to represent whether up to 64 SSBs 710 are transmitted in the frequency band above 6 GHz. Specifically, in the frequency band below 6 GHz, one bit may indicate whether one SSB is transmitted. When the first MSB is '1', it may indicate that the first SSB is actually transmitted from the BS, and when it is '0', it may indicate that the first SSB is not transmitted from the BS.

Figure 7:
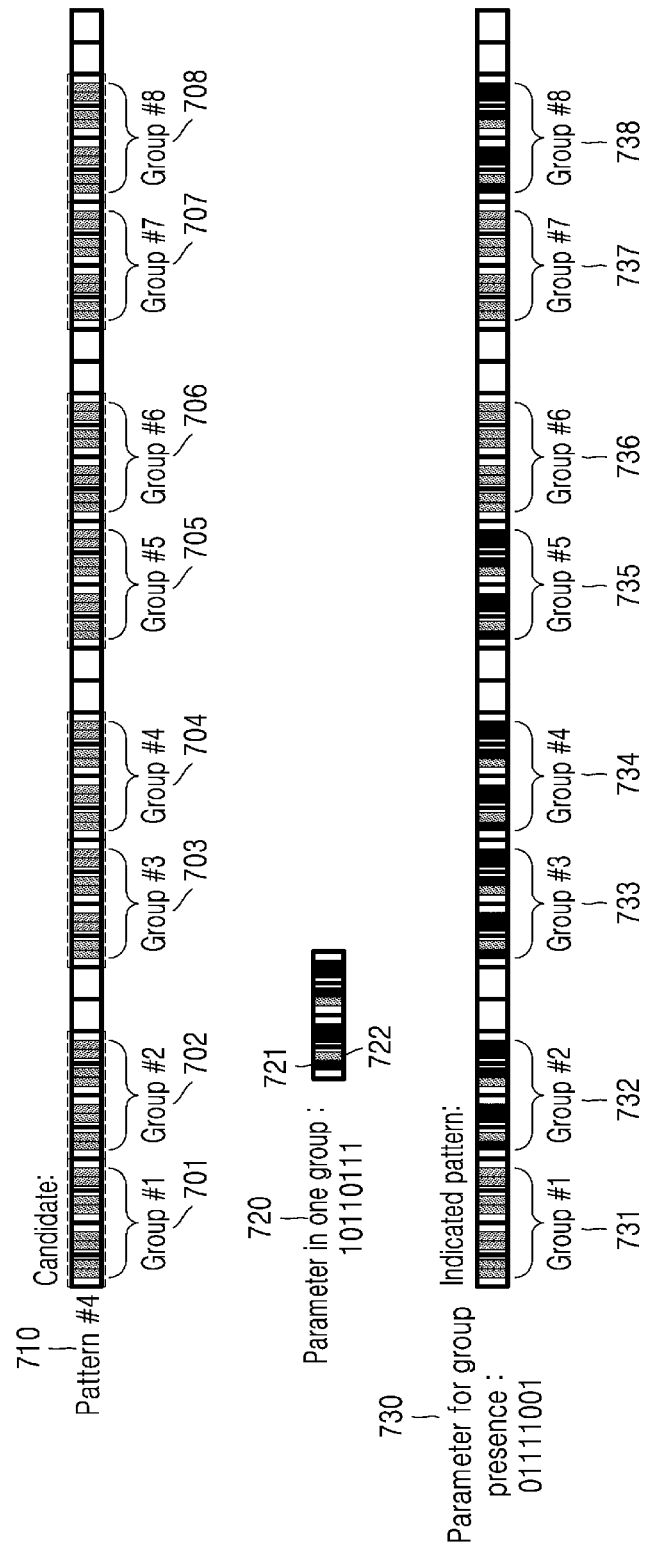
FIG. 7 illustrates synchronization signal block information actually transmitted in system information in a 5G communication system, according to an embodiment of the disclosure.

FIG. 7 illustrates an occasion when an SSB is transmitted with 120 kHz of SCS in a frequency band above 6 GHz.

Referring to FIG. 7, to represent whether up to 64 SSBs are transmitted in a frequency band above 6 GHz, 8 SSBs may be grouped into one, so 64 SSBs may be divided into 8 groups 701 to 708. Hence, a total of 16 bits, 8 bits 720 of which indicate whether 8 SSBs in one group are transmitted and 8 bits 730 of which indicate whether there are 8 groups, may indicate whether all of the SSBs are transmitted. The 8 bits indicating whether transmission is made for one group may represent a pattern 720 in the same way as the aforementioned frequency band below 6 GHz. Specifically, when the first MSB is '1', it indicates that the first SSB is transmitted 721 from the BS, and when the second MSB is '0', it indicates that the second SSB is not actually transmitted 722 from the BS. For the 8 bits 730 indicating whether there are 8 groups, when the first MSB is '0'(731), it indicates that 8 SSBs in the first group, Group #731, are not transmitted altogether (731). When the second MSB is '1', it indicates that 8 SSBs in the second group, Group #2 732, are transmitted (732) in a transmission pattern 720 of 8 consecutive SSBs in the configured one group. The actually transmitted SSB indication information transmitted not by system information but by higher layer signaling may be indicated in a total of 64 bits, each bit indicating whether one SSB is transmitted, thereby representing whether up to 64 SSBs are each transmitted regardless of the frequency band.

The UE may obtain the SIB by decoding the PDCCH and PDSCH based on system information included in the received MIB. The SIB may include one of at least UL cell bandwidth, a random access parameter, a paging parameter, a UL power control related parameter, etc. The UE may establish a radio link with the network through a random access procedure based on system information and synchronization with the network obtained in a cell search procedure. Random access may be used in a contention-based method or a contention-free method. The contention-based access method may be used for the purpose of e.g., the UE performing cell selection and re-selection in an initial cell access step or the UE going into an RRC connected state from an RRC idle state. The contention-free random access may be used to re-establish UL synchronization in case of DL data arrival, handover, or location measurement.

Figure 8:
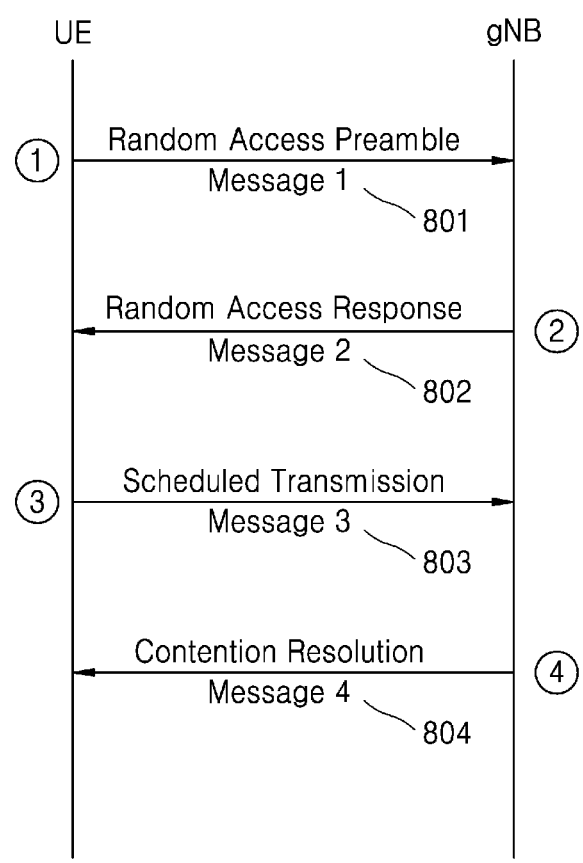
FIG. 8 illustrates a 4-step random access procedure, according to an embodiment of the disclosure.

A 4-step random access procedure (or 4-step RACH procedure) will now be described in detail with reference to FIG. 8. FIG. 8 illustrates a 4-step random access procedure. Referring to FIG. 8, in a first step 801 of the random access procedure, the UE may transmit a random access preamble (or message 1) to the BS (or gNB). The BS may then measure a transmission delay between the UE and the BS and may be UL synchronized. In this case, the UE may transmit the random access preamble selected arbitrarily from a random access preamble set given in advance by the system information. Initial transmission power of the random access preamble may be determined based on a path loss between the BS and the UE, which is measured by the UE. Furthermore, the UE may determine a transmission beam direction (or transmission beam or beam) of the random access preamble based on a synchronization signal (or an SSB) received from the BS, and transmit the random access preamble by applying the determined transmission beam direction.

In a second step 802, the BS may transmit, to the UE, a random access response (RAR) (or message 2) to a detected random access attempt. The BS may transmit, to the UE, a UL transmission timing control command from a transmission delay measured from the random access preamble received in the first step. The BS may also transmit, to the UE, a UL resource and power control command to be used by the UE in scheduling information. The scheduling information may include control information about the UL transmission beam of the UE. The RAR is transmitted in a PDSCH and includes the following information:
 a random access preamble sequence index detected by the network (or BS)
 temporary cell radio network temporary identifier (TC-RNTI)
 uplink scheduling grant
 a timing advance value When the UE fails to receive the RAR, which is scheduling information for message 3 in the second step 802, the procedure proceeds back to the first step 801. When the procedure proceeds back to the first step, the UE increases transmission power of the random access preamble by a certain step (which is called power ramping) for transmission, thereby increasing a chance of receiving the random access preamble at the BS.

In the third step 803, the UE may transmit, to the BS, UL data (scheduled transmission or message 3) including its UE ID in a UL data channel (physical uplink shared channel (PUSCH)) by using a UL resource allocated in the second step 802. Transmission timing of the UL data channel to transmit the message 3 follows the UL transmission timing control command received from the BS in the second step 802. Furthermore, transmission power of the UL data channel to transmit the message 3 is determined by taking into account a power ramping value of the random access preamble and power control command received from the BS in the second step 802. The UL data channel to transit the message 3 is a first UL data signal transmitted by the UE to the BS after the UE transmits the random access preamble.

Finally, in the fourth step 804, when the BS determines that the UE has performed random access without collision with another UE, the BS may transmit, to the UE, data (a contention resolution message or message 4) including an ID of the UE that has transmitted the UL data in the third step 803. When receiving the signal transmitted by the BS in the fourth step 804, the UE determines that random access is successful. The UE may then transmit HARQ-ACK or NACK indicating whether the message 4 was successfully received to the BS in a UL control channel (or physical uplink control channel (PUCCH)).

When the data transmitted by the UE in the third step 803 collides with data from another UE and the BS fails to receive the data from the UE, the BS may not perform any more data transmission to the UE. Hence, when the UE fails to receive data transmitted in the fourth step 804 from the BS in a certain time period, the UE may determine that the random access procedure has failed and may restart from the first step 801.

As described above, in the first step 801 of the random access procedure, the UE may transmit the random access preamble in a PRACH. There are 64 available preamble sequences in each cell, and depending on the transmission type, four long preamble formats and nine short preamble formats may be used. The UE may use a root sequence index and a cyclic shift value signaled in the system information to create the 64 preamble sequences, and randomly select and use one sequence as a preamble.

The network may notify the UE of which time-frequency resources may be used for the PRACH in an SIB or through higher layer signaling. The frequency resource indicates a starting RB point for transmission to the UE, and the number of RBs to be used may be determined based on the preamble format and SCS applied. The network may notify the UE of the time resource such as a subframe index and a start symbol including a preset PRACH configuration cycle and a PRACH transmission time (interchangeably used with a PRACH occasion or transmission time), the number of PRACH transmission occasions in the slot, etc., which are preset in Table 3 below, through a PRACH configuration index (0 to 255). Through the PRACH configuration index, random access configuration information included in the SIB, and an index of an SSB selected by the UE, the UE may identify time and frequency resources in which to transmit the random access preamble and transmit the selected sequence to the BS as a preamble.

TABLE 3

| PRACH configuration Index | Preamble format | $n_{SFN}$ mod x = y | | Subframe number | Starting symbol | Number of PRACH slots within a subframe | number of time-domain PRACH occasions within a PRACH slot | PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | | ... | | | |
| 104 | A1 | 1 | 0 | 1, 4, 7 | 0 | 2 | 6 | 2 |
| ... | | | | | ... | | | |
| 251 | C | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

Figure 9:
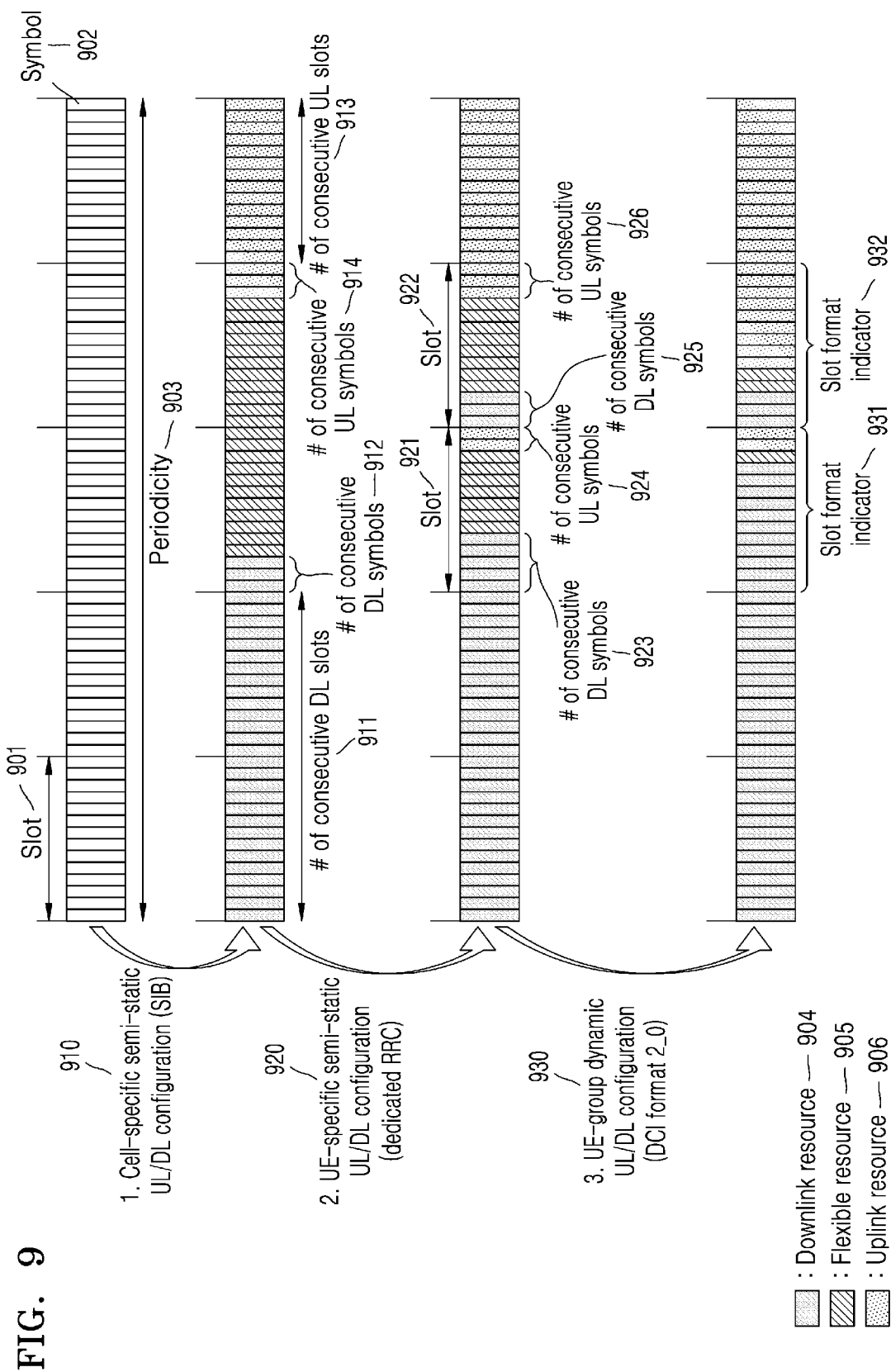
FIG. 9 illustrates an example of uplink (UL)-downlink (DL) configurations considered in a 5G communication system, according to an embodiment of the disclosure.

FIG. 9 illustrates an example of UL-DL configurations considered in a 5G communication system. In the 5G communication system, UL-DL configurations of symbols/slots may be set up in three steps. First, UL-DL of a symbol/slot may be semi-statically configured in symbols through cell-specific configuration information 910 in system information. Specifically, the cell-specific UL-DL configuration information in the system information may include UL-DL pattern information and reference subcarrier information. Through the UL-DL pattern information, a pattern periodicity 903, the number of consecutive DL slots 911 from a starting point of each pattern and the number of symbols 912 of the next slot, and the number of consecutive UL slots 913 from the end of the pattern and the number of symbols 914 of the next slot may be indicated. In this case, the UE may determine slots and symbols for which UL or DL is not indicated as flexible slots and symbols.

Second, through user-specific configuration information by dedicated higher layer signaling, slots 921 and 922 including the flexible slot or flexible symbol may be indicated with the numbers 923 and 925 of consecutive DL symbols from the starting symbol of each slot and the numbers 924 and 926 of consecutive UL symbols from the end of each slot or may be indicated as full-slot DL or full-slot UL.

Finally, to dynamically change the DL signal transmission section and the UL signal transmission section, symbols indicated as the flexible symbols (that is, symbols not indicated as DL or UL) in each slot may be indicated by slot format indicators (SFIs) 931 and 932 included in a DL control channel to indicate whether each symbol is a DL symbol, a UL symbol or a flexible symbol. The slot format indicator may select one index from a table in which UL-DL configurations of 14 symbols in one slot are set up in advance as in Table 4 below.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |

TABLE 4-continued

| Format | \multicolumn{14}{c}{Symbol number in a slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | F | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | F | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on TDD-UL-DL-ConfigurationCommon, or TDD-UL-DL-ConfigDedicated and, if any, on detected DCI formats} |

Although an additional coverage extension technology has been introduced for 5G mobile communication services as compared to traditional LTE communication services, coverage of the BS and the UE decreases as actual coverage of the 5G mobile communication services mostly uses a TDD system suitable for a service having a high proportion of DL traffic and has a higher center frequency to increase the frequency band, so coverage enhancement is a key requirement. Especially, because transmission power of the UE is generally lower than transmission power of the BS and a proportion of DL is higher than that of UL in the time domain to support a service having a higher DL traffic portion, coverage enhancement in the UL channel is a key demand. To enhance the coverage of the UL channel between the BS and the UE, there is a method of increasing time resources in the UL channel, reducing the center frequency, or increasing transmission power of the UE. Changing the frequency, however, is restricted to a frequency band determined for each network operator, and the maximum transmission power of the UE is determined within a rule to reduce interference.

Accordingly, to enhance coverage of the BS and the UE, UL and DL resources may be divided even in the frequency domain as in the FDD system instead of dividing portions in the time domain according to UL and DL traffic portions in the TDD system. A system that is able to flexibly divide UL and DL resources in the time domain and the frequency domain may be called an (time or frequency) divisional duplexing (DD) (XDD) system, flexible TDD system, a hybrid TDD system, a TDD-FDD system, a hybrid TDD-FDD system, etc., but will be called the XDD system in the disclosure.

Figure 10:
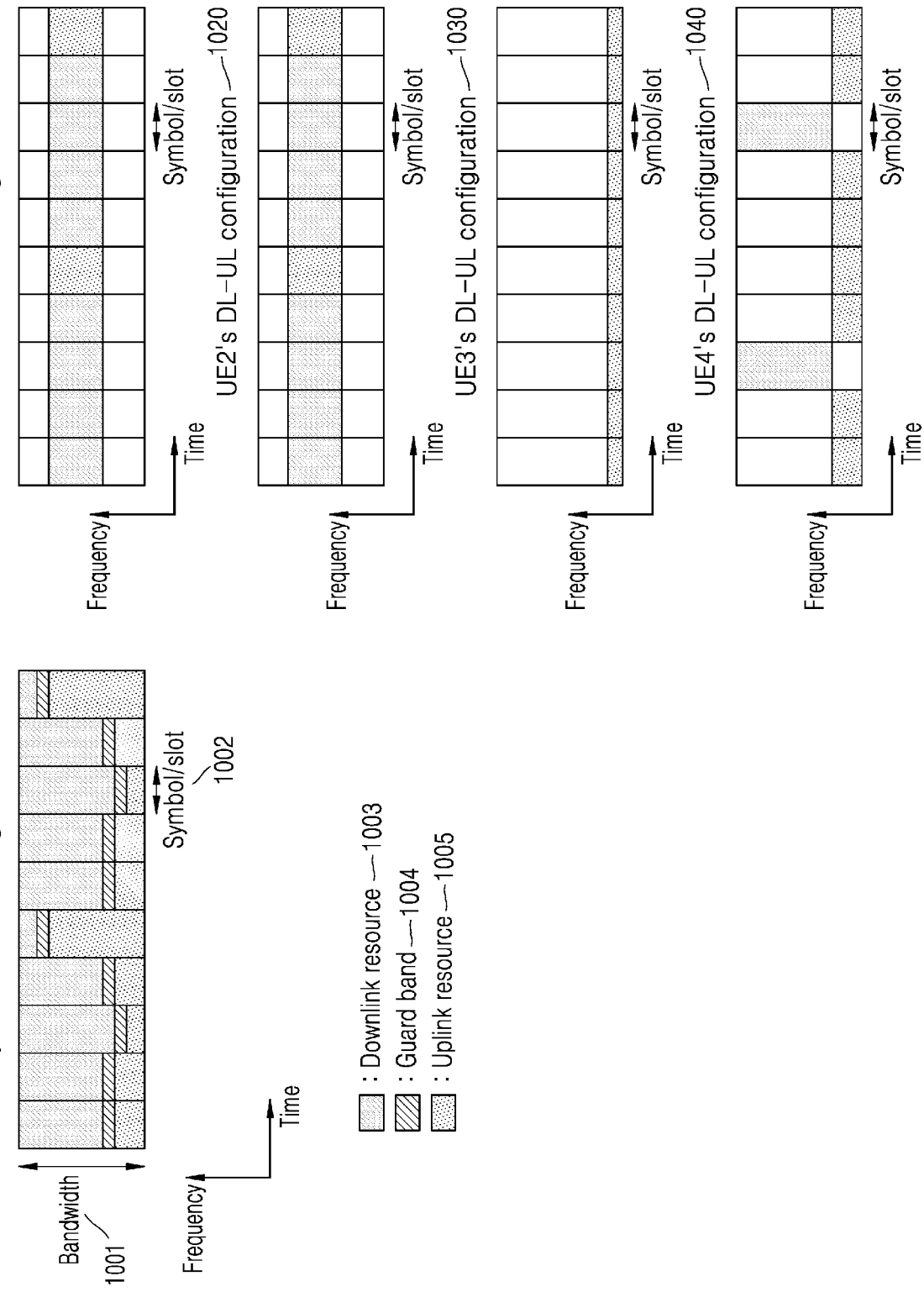
FIG. 10 illustrates UL and DL configurations of an X (time or frequency) division duplexing (DD) system, in which UL and DL resources are divided flexibly in the time-frequency domain, according to an embodiment of the disclosure.

FIG. 10 illustrates UL and DL configurations of an XDD system, in which UL and DL resources are divided flexibly in the time and frequency domain. From the perspective of the BS, an entire XDD system UL-DL configuration 1000 may flexibly allocate a resource to each symbol or slot 1002 depending on UL and DL traffic portions in an entire frequency band 1001. In this case, a guard band 1004 may be allocated for a frequency band between a DL resource 1003 and a UL resource 1005. The guard band may be allocated as a way to reduce interference in receiving a UL channel or signal due to out-of-band emission occurring when the BS transmits a DL channel or signal on the DL resource 1003. In this case, for example, UE 1 1010 and UE 2 1020 generally having more UL traffic than DL traffic may be allocated DL and UL resources at a ratio of 4:1 in the time domain according to a configuration from the BS. At the same time, UE 3 1030 that is operating on cell edges and has insufficient UL coverage may be allocated only a UL resource in a particular time section according to a configuration from the BS. In addition, UE 4 1040 that is operating on cell edges and has insufficient UL coverage but relatively has lots of DL and UL traffic may be allocated a lot of UL resources in the time domain for UL coverage and a lot of DL resources in the frequency domain. Like the above example, UEs operating relatively at a center of the cell and having lots of DL traffic may be allocated more DL resources in the time domain, and UEs operating relatively on cell edges and not having sufficient UL coverage may be allocated more UL resources in the time domain.

In the disclosure, UL coverage may be enhanced by optimizing relations between BWPs and UL-DL configurations to flexibly allocate UL and DL resources in the time and frequency domain. Main issues of the disclosure will now be described through specific embodiments.

Although the disclosure proposes a relation between a BWP and a UL-DL configuration and an associated method and apparatus for transmitting or receiving a channel and signal in the BS and the UE to enhance coverage, the disclosure will be applied to a method and apparatus for transmitting or receiving a channel and signal for a service (e.g., URLLC) that may be provided by a 5G system having different purposes than coverage enhancement. Furthermore, the disclosure provides a method and apparatus for transmitting or receiving a channel and signal in the BS and the UE in an XDD system, but the disclosure is not limited to the XDD system but may also be applied to a method and apparatus for transmitting or receiving a channel and signal in another division duplex system that may be provided in the 5G system.

First Embodiment

A first embodiment of the disclosure is a method of configuring a relation between a BWP and a UL-DL configuration in the XDD system. Through the method of configuring a relation between a BWP and a UL-DL configuration as described in this embodiment, the UE may be allocated more required resources by BWP switching made depending on the occasion such as an occasion when the UL or DL time domain resource is not sufficient.

Specifically, as UL and DL resources may be divided and allocated not only in the time domain but also in the frequency domain in the XDD system as described above, UL-DL configurations may be made in the frequency domain and the time domain through a different UL-DL configuration for each BWP instead of performing the UL-DL configuration only in the time domain as in the traditional TDD system. The BS and the UE may change resources basically in the frequency domain through BWP switching and may change UL-DL configurations in the frequency domain and the time domain by changing resources in the time domain through a UL-DL configuration associated with the BWP.

Accordingly, methods of configuring a relation between a BWP and a UL-DL configuration in the XDD system is proposed.

The following methods may be considered as the method of configuring a relation between a BWP and a UL-DL configuration in the XDD system:

Method 1

The BS may perform UL-DL configurations in the time domain for each BWP for the UE. Therefore, when there is a change of BWP, the UL-DL configuration in the time domain may be changed as well. BWP-specific UL-DL configuration information configured for each BWP may include UL-DL pattern information and reference subcarrier information. The UL-DL pattern information may indicate a pattern periodicity 903 in the time domain, the number of consecutive DL slots 911 from a starting point of each pattern and the number of symbols 912 of the next slot, and the number of consecutive UL slots 913 from the end of the pattern and the number of symbols 914 of the next slot. In this case, slots and symbols for which UL or DL is not indicated may be determined as flexible slots and symbols.

In this method, UL-DL configurations for symbols/slots may be set up e.g., in four steps. First, UL-DL for symbols/slots corresponding to all BWPs (or a particular initial BWP or a default BWP) may be semi-statically configured in symbols through cell-specific configuration information in system information. Specifically, the cell-specific UL-DL configuration information in the system information may include UL-DL pattern information and reference subcarrier information. The UL-DL pattern information may indicate a pattern periodicity, the number of consecutive DL slots from a starting point of each pattern and the number of symbols of the next slot, and the number of consecutive UL slots from the end of the pattern and the number of symbols of the next slot. In this case, slots and symbols for which UL or DL is not indicated may be determined as flexible slots and symbols.

Second, through user-specific configuration information by dedicated higher layer signaling, slots including a flexible slot or flexible symbol corresponding to all BWPs (or a particular initial BWP or a default BWP) may be indicated with the number of consecutive DL symbols from the starting symbol of each slot and the number of consecutive UL symbols from the end of the slot or may be indicated as full-slot DL or full-slot UL.

Third, BWP-specific UL-DL may be configured by dedicated higher layer signaling. In a BWP for which there is a BWP-specific UL-DL configuration, the BWP-specific UL-DL configuration set up for the BWP is obeyed while the UL-DL configurations set up for all the BWPs (or a particular initial BWP or a default BWP) in the first step are ignored. The BWP-specific UL-DL configuration may include UL-DL pattern information and reference subcarrier information as in the cell-specific UL-DL configuration information. The UL-DL pattern information may indicate a pattern periodicity, the number of consecutive DL slots from a starting point of each pattern and the number of symbols of the next slot, and the number of consecutive UL slots from the end of the pattern and the number of symbols of the next slot. In this case, slots and symbols for which UL or DL is not indicated may be determined as flexible slots and symbols.

Finally, to dynamically change the DL signal transmission section and the UL signal transmission section, symbols indicated as the flexible symbols (that is, symbols not indicated as DL or UL) in each slot may be indicated by slot format indicators (SFIs) 931 and 932 included in a DL control channel to indicate whether each symbol is a DL symbol, a UL symbol or a flexible symbol. To indicate this, one index may be selected through the slot format indicator from a table in which UL-DL configurations for 14 symbols to indicate this.

UL-DL configuration of symbols/slots is not limited to the method but may be performed in other various methods.

Figure 11:
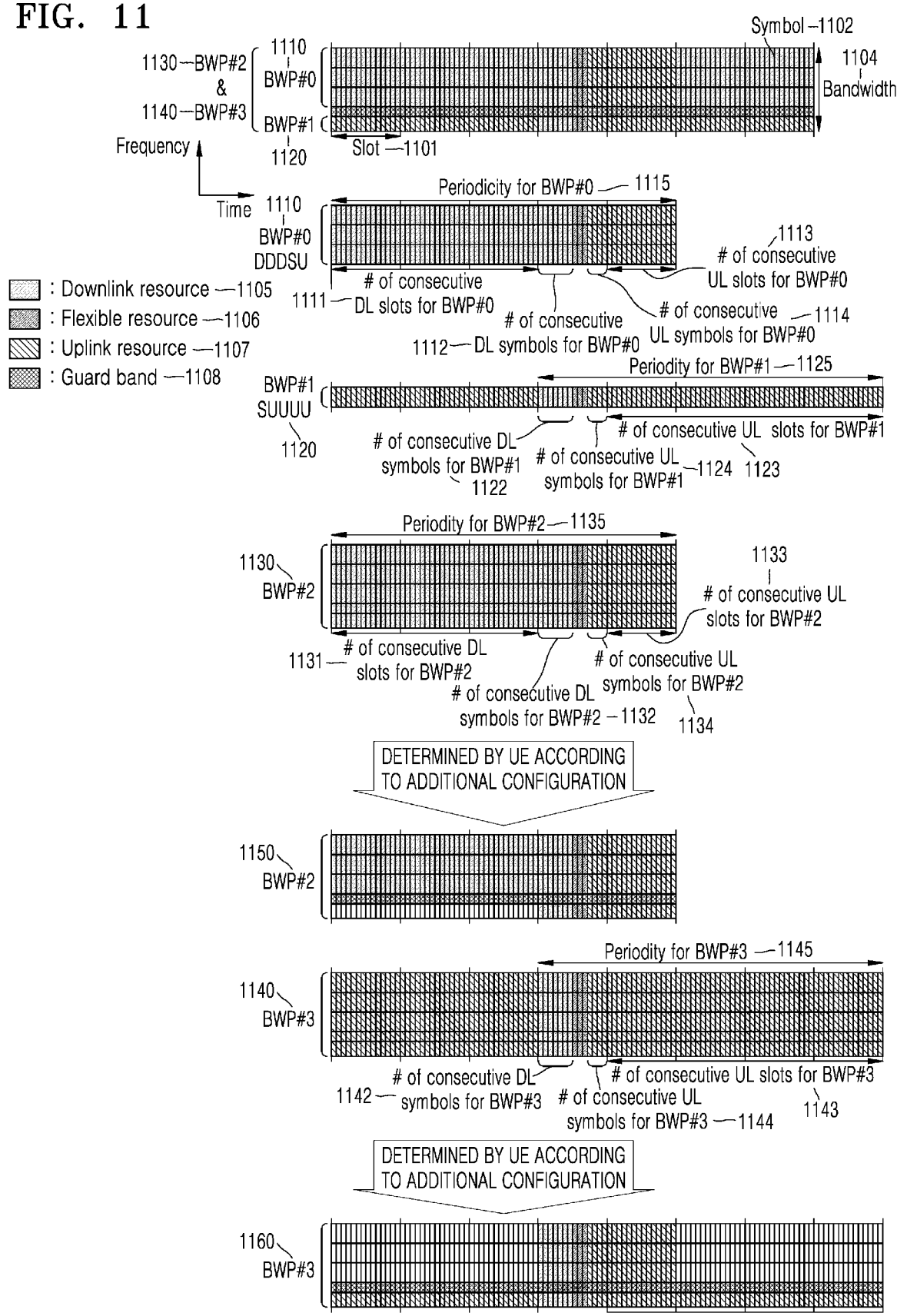
FIG. 11 illustrates an example of UL-DL configurations in time and frequencies in an XDD system, according to an embodiment of the disclosure.

FIG. 11 illustrates an example of UL-DL configurations for each BWP in the time domain in an XDD system. Referring to FIG. 11, one UE may be configured with four BWPs 1110, 1120, 1130 and 1140 for UL-DL in the respective time domain. For example, pattern periodicity of BWP #0 1110 being 5 slots 1115 (or 5 ms based on 15 kHz of SCS), the number of consecutive DL slots from a starting point of the pattern being three 1111, the number of DL symbols in the next slot being seven 1112, the number of consecutive UL slots being one 1113 from an end of the pattern, and the number of UL symbols in the next slot being four 1114 may be configured. In this case, BWP #0 1110 is configured with more DL resources than UL resources in the time domain, so it may be activated for the UE when DL traffic is higher than UL traffic. Pattern periodicity of BWP #1 1120 being 5 slots 1125 (or 5 ms based on 15 kHz of SCS), the number of consecutive DL slots from a starting point of the pattern being zero, the number of DL symbols in the next slot being seven 1122, the number of consecutive UL slots being four 1123 from an end of the pattern, and the number of UL symbols in the next slot being four 1124 may be configured. In this case, BWP #1 1120 is configured with a narrow frequency band and more UL resources than DL resources in the time domain, so it may be activated for the UE for UL repetitive transmission when UL coverage is insufficient. Pattern periodicity of BWP #2 1130 being 5 slots 1135 (or 5 ms based on 15 kHz of SCS), the number of consecutive DL slots from a starting point of the pattern being three 1131, the number of DL symbols in the next slot being seven 1132, the number of consecutive UL slots being one 1133 from an end of the pattern, and the number of UL symbols in the next slot being four 1134 may be configured. In this case, BWP #2 1130 is configured with a wide frequency band and more DL resources than UL resources in the time domain, so it may be activated for the UE when high traffic is required for the service and DL traffic is higher than UL traffic. Pattern periodicity of BWP #3 1140 being 5 slots 1145 (or 5 ms based on 15 kHz of SCS), the number of consecutive DL slots from a starting point of the pattern being zero, the number of DL symbols in the next slot being seven 1142, the number of consecutive UL slots being four 1143 from an end of the pattern, and the number of UL symbols in the next slot being four 1144 may be configured. In this case, BWP #3 1140 is configured with a wide frequency band and more UL resources than DL resources in the time domain, so it may be activated for the UE to support a service having high DL traffic while performing UL repetitive transmission when UL coverage is short but the service requires high traffic. BWP #2 1130 and BWP #3 1140 have the same frequency band, but BWP #2 may be configured with a DL resource and BWP #3 may be configured with a UL resource in the same time domain according to the UL-DL configuration. In this case, even when the UE is configured with the resource 1130 or 1140 in all the frequency bands, the UE may determine which resource 1150 or 1160 has been actually configured in the frequency band according to other configurations (guard band configuration or indication or BWP configuration) (a method of identifying which resource of the frequency band is for DL or UL in the configured frequency band is proposed in a second embodiment).

The method may easily change the UL-DL configuration by BWP switching and associated change in UL-DL configuration without additional indication or signaling. In this case, from the perspective of the UE, UL-DL may be efficiently configured with little overhead because the UE is indicated about a UL-DL configuration for a currently activated BWP without need to be indicated about configurations of all resources.

Method 2

The BS may perform UL-DL configuration in multiple time domains for the UE. Accordingly, UL-DL configuration may be performed in the time domain not for each BWP but in combination. UL-DL configuration in the time domain is not changed along with the BWP switching, but may be changed separately from the BWP.

In this method, UL-DL configurations for symbols/slots may be set up e.g., in three steps. First, UL-DL configuration of one or more symbols/slots may be semi-statically performed in symbols through cell-specific configuration information 910 in system information. Specifically, each cell-specific UL-DL configuration information in the system information may include UL-DL pattern information and reference subcarrier information. Through the UL-DL pattern information, a pattern periodicity 903, the number of consecutive DL slots 911 from a starting point of each pattern and the number of symbols 912 of the next slot, and the number of consecutive UL slots 913 from the end of the pattern and the number of symbols 914 of the next slot may be indicated. In this case, slots and symbols for which UL or DL is not indicated may be determined as flexible slots and symbols. One or more cell-specific UL-DL configurations may be indicated, and the UE may be indicated about one of them.

Second, through user-specific configuration information by dedicated higher layer signaling, slots 921 and 922 including the flexible slot or flexible symbol in the indicated cell-specific UL-DL configuration may be indicated with the numbers 923 and 925 of consecutive DL symbols from the starting symbol of each slot and the numbers 924 and 926 of consecutive UL symbols from the end of each slot or may be indicated as full-slot DL or full-slot UL.

Finally, to dynamically change the DL signal transmission section and the UL signal transmission section, symbols indicated as the flexible symbols (that is, symbols not indicated as DL or UL) in each slot may be indicated by slot format indicators (SFIs) 931 and 932 included in a DL control channel to indicate whether each symbol is a DL symbol, a UL symbol or a flexible symbol. To indicate this, the slot format indicator may select one index from a table in which UL-DL configurations for 14 symbols in one slot are set up in advance as in Table 4 above.

UL-DL configuration of symbols/slots in the method is not limited to the method but may be performed in other various methods.

Figure 12:
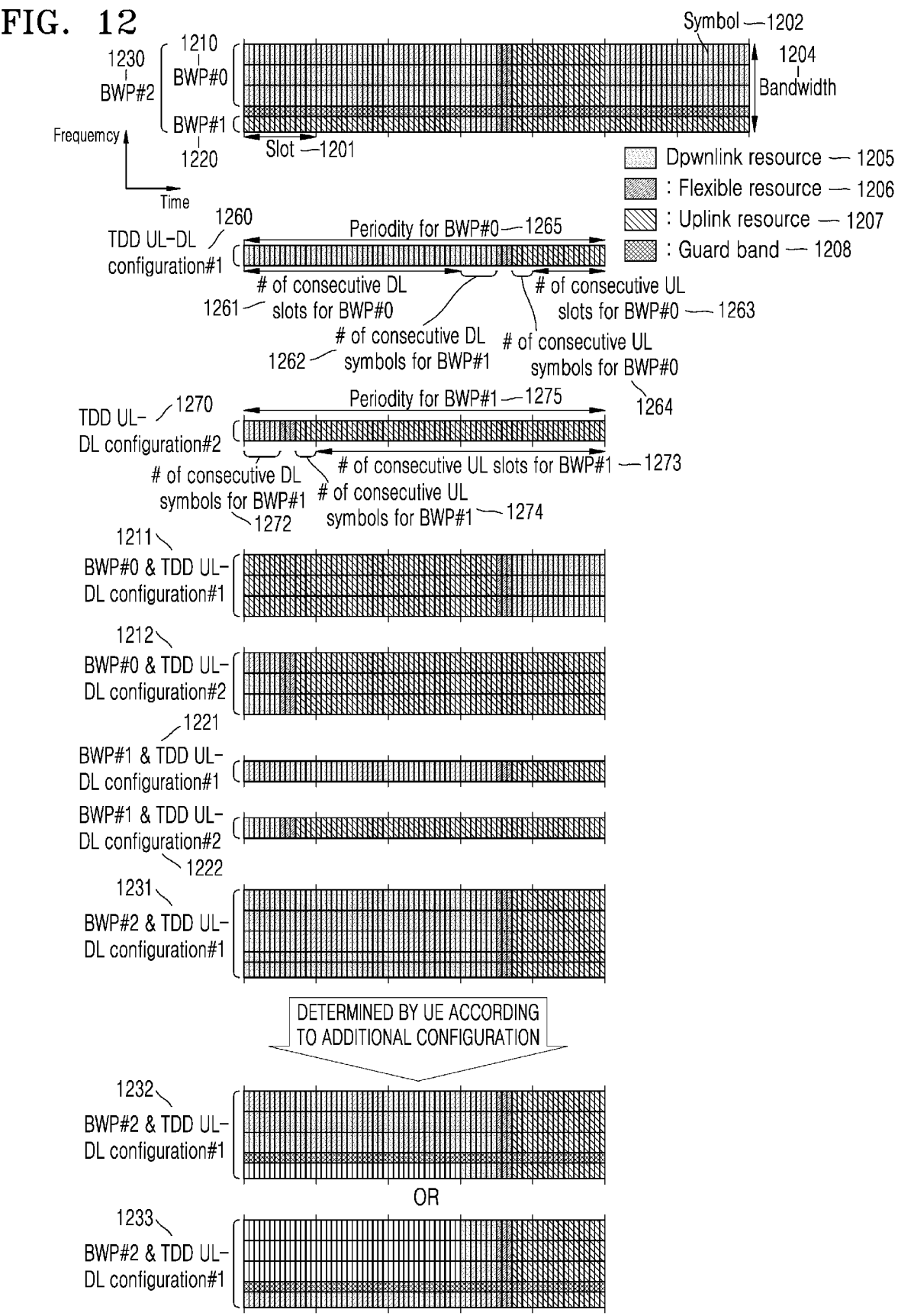
FIG. 12 illustrates another example of UL-DL configurations in time and frequencies in an XDD system, according to an embodiment of the disclosure.

FIG. 12 illustrates an example of association between a BWP and a UL-DL configuration in the time domain in an XDD system. Referring to FIG. 12, one UE is configured with three BWPs 1210, 1220, and 1230 and indicated about UL-DL configurations 1260 and 1270 in two time domains. For example, pattern periodicity of UL-DL configuration #1 1260 in the first time domain being 5 slots 1265 (or 5 ms based on 15 kHz of SCS), the number of consecutive DL slots from a starting point of the pattern being three 1261, the number of DL symbols in the next slot being seven 1262, the number of consecutive UL slots being one 1263 from an end of the pattern, and the number of UL symbols in the next slot being four 1264 may be configured. Pattern periodicity of UL-DL configuration #2 1270 in the second time domain being 5 slots 1275 (or 5 ms based on 15 kHz of SCS), the number of consecutive DL slots from a starting point of the pattern being zero, the number of DL symbols in the next slot being seven 1272, the number of consecutive UL slots being four 1273 from an end of the pattern, and the number of UL symbols in the next slot being four 1274 may be configured. When the BWP #0 1210 is activated and the UE is indicated about UL-DL configuration #1 1260, the UE may be configured with the configuration when DL traffic is higher than UL traffic because the UE is configured 1211 to have more DL resources than UL resources in the time domain. Moreover, when UL-DL configuration #2 1270 is indicated, the UE may be configured with the configuration when the UE has more UL traffic than DL traffic because more UL resources are configured than DL resources 1212. In addition, when BWP #1 1220 is activated and the UE is indicated about UL DL configuration #1 1260, the UE may be configured with the configuration when having low traffic 1221 because there are small frequency resources 1221. When BWP #1 1220 is activated and the UE is indicated about UL-DL configuration #2 1270, UEs located on cell edges and having short UL coverage may be configured with the configuration because there are small frequency resources and more UL resources are allocated than the DL resources in the time domain. When BWP #2 1230 is activated and UL-DL configuration #1 1260 is indicated, the UE may be indicated about UL-DL configuration #1 1260 when having high traffic because it uses the entire frequency resources 1231. In this case, even though the UE is configured with the resources 1231 in the entire frequency band, the UE may determine which resource 1232 or 1233 has been actually configured in the frequency band according to other configurations (guard band configuration or indication or BWP configuration) (a method of identifying which resource of the frequency band is for DL or UL in the configured frequency band is proposed in the second embodiment).

The method may support a lot more cases and may be applied to various scenarios by separately configuring the BWP and the UL-DL configuration.

Second Embodiment

The second embodiment of the disclosure describes a method of identifying which resource in the frequency domain is for DL or UL in the first embodiment. The UE may need to determine which resource is actually allocated in the frequency domain when the UE is configured with a UL-DL configuration only in the time domain as in the previous embodiment. In the XDD system in particular, as described above, as a way to reduce interference in receiving a UL channel or signal due to out-of-band emission occurring when the BS transmits a DL channel or signal in a DL resource, a guard band is configured, but when the configuration is violated because of wrong reception or wrong determination of the UE, both DL and UL may be subject to severe interference. To prevent this, a method of identifying a resource configuration in the frequency domain even when the UE is configured with a UL-DL configuration only in the time domain will be described.

Specifically, the UE may determine that there is only DL or UL resource at one point when there is no guard band, and determine that there are both UL and DL resources at one point in the frequency domain when the guard band is configured. Furthermore, as described above, it is very difficult for the BS to implement resource allocation that avoids consecutive DLs or ULs at the same point in time, and as mentioned above, interference due to the out-of-band emission occurs between UL and DL, and accordingly may occur at multiple points. Hence, the UE and the BS may indirectly identify between DL resource and UL resource by configuring the guard band. However, when a frequency band in a BWP includes the guard band, a higher frequency section and a lower frequency section may be separated based on the guard band but the UE may not determine which one is for UL or DL based on only the guard band.

Hence, the following methods may be considered as a method of identifying resource configurations in the frequency domain even when the UE is configured with the UL-DL configuration only in the time domain in the XDD system.

Method 1

The UE may determine that a section including a frequency band for which an initial BWP (or default BWP or the lowest indexed BWP) is configured has been configured as DL resources. Specifically, as an SSB block always needs to be transmitted from the BS for UEs that make initial access thereto in the initial BWP, the guard band is prevented from being included and many resources may be considered as DL resources. Hence, a section having higher frequencies is separated from a section having lower frequencies based on the configured guard band, and the section including the initial BWP in the frequency band may be determined as being configured for DL and the section not including the initial BWP may be determined as being configured for UL.

Figure 13:
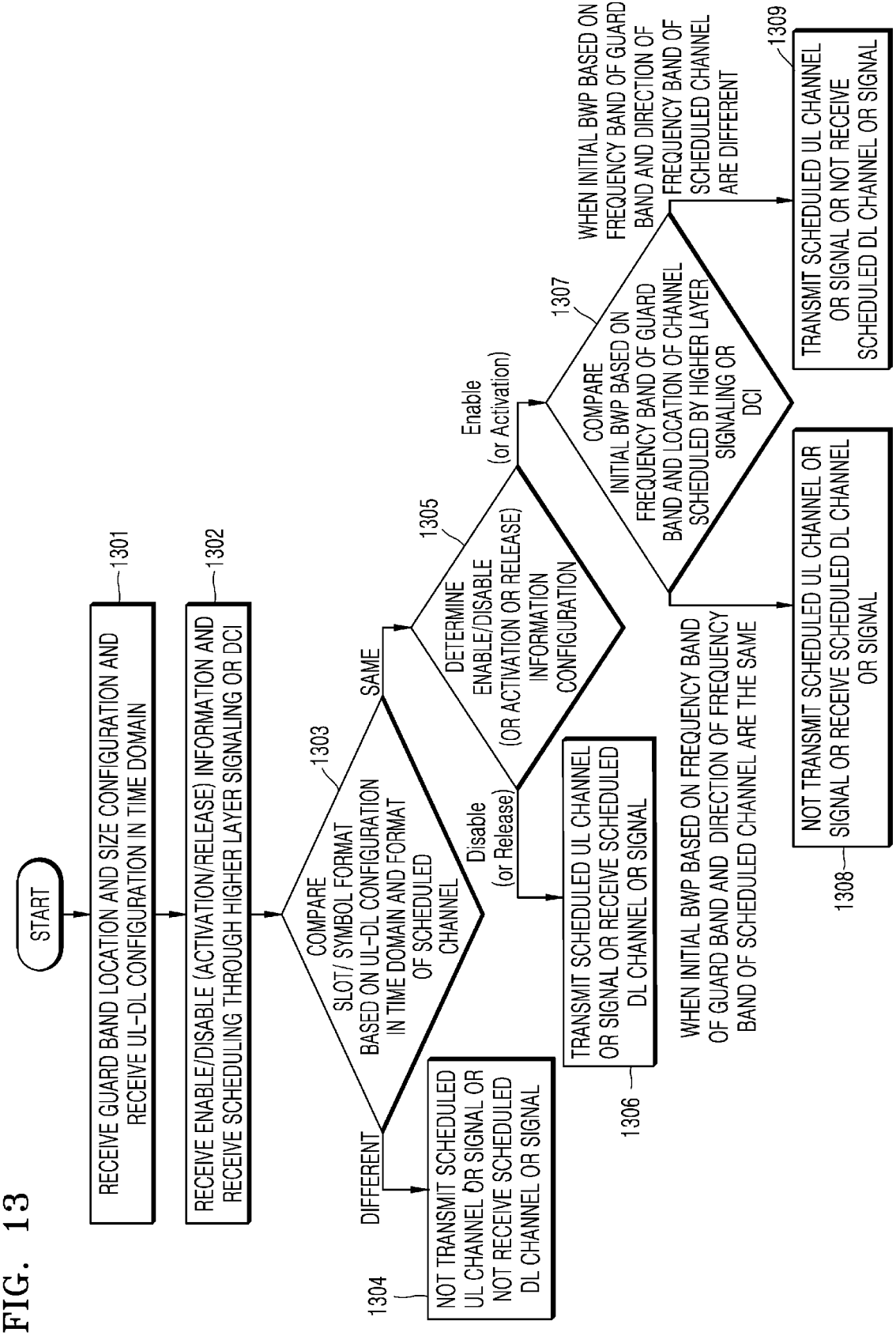
FIG. 13 is a flowchart for describing operation of a user equipment (UE) when a guard band is configured, according to an embodiment of the disclosure.

FIG. 13 is a flowchart for describing operations of a method by which the UE is able to identify resource configurations in a frequency band, according to the second embodiment.

The UE may receive guard band location and size configuration information and a UL-DL configuration in the time domain in operation 1301. The UE may receive information for dynamically enabling or disabling or activating or releasing) the guard band and scheduling channel information through higher layer signaling or DCI, in operation 1302. Operations 1301 and 1302 are described sequentially for convenience of explanation, but may be performed at the same time or in a different order. The UE may compare a slot/symbol format based on the UL-DL configuration in the time domain and a format of the configured or scheduled channel, in operation 1303. When the slot/symbol format based on the UL-DL configuration in the time domain is different from the format of the configured or scheduled channel in operation 1303, the UE does not perform transmission when the format of the configured or scheduled channel or signal is UL and does not perform reception when the format is DL in operation 1304. When the slot/symbol format based on the UL-DL configuration in the time domain is the same as the format of the configured or scheduled channel in operation 1303, the UE determines whether the guard band is dynamically enabled or disabled (or activated or released) in operation 1305. When the UE determines that the guard band is dynamically disabled (or released) in operation 1305, the UE performs transmission when the format of the configured or scheduled channel or signal is UL and performs reception when the format is DL in 1306. When the UE determines that the guard band is dynamically enabled (or activated) in operation 1305, the UE compares an initial BWP configured based on the frequency band of the guard band and a location of the channel configured or scheduled by higher layer signaling or DCI in operation 1307. When the initial BWP configured based on the frequency band of the guard band and the location of the channel or signal configured or scheduled through higher layer signaling or DCI are the same, the UE does not transmit a configured or scheduled UL channel or signal but receives a configured or scheduled DL channel or signal, in operation 1308. When the initial BWP configured based on the frequency band of the guard band is different from the location of the channel or signal configured or scheduled through higher layer signaling or DCI, the UE transmits the configured or scheduled UL channel or signal and does not receive the configured or scheduled DL channel or signal, in operation 1309.

This method is not limited to using the frequency band of the initial BWP, and may be applied to a frequency band of a default BWP or the lowest indexed BWP instead of the frequency band of the initial BWP.

Method 2

The UE may determine that a section including a frequency band in which an SSB including SIB information is transmitted is configured as a DL resource. Specifically, as an SSB block including the SIB information always needs to be transmitted from the BS for UEs that make initial access thereto in a frequency band in which the SSB including the SIB information is transmitted, the guard band is prevented from being included and many resources may be considered as DL resources. Hence, a section having higher frequencies is separated from a section having lower frequencies based on the configured guard band, and the section included in the frequency band in which the SSB including the SIB information is transmitted may be determined as being configured for DL and the section not including the frequency band where the SSB including the SIB information is transmitted may be determined as being configured for UL.

Figure 14:
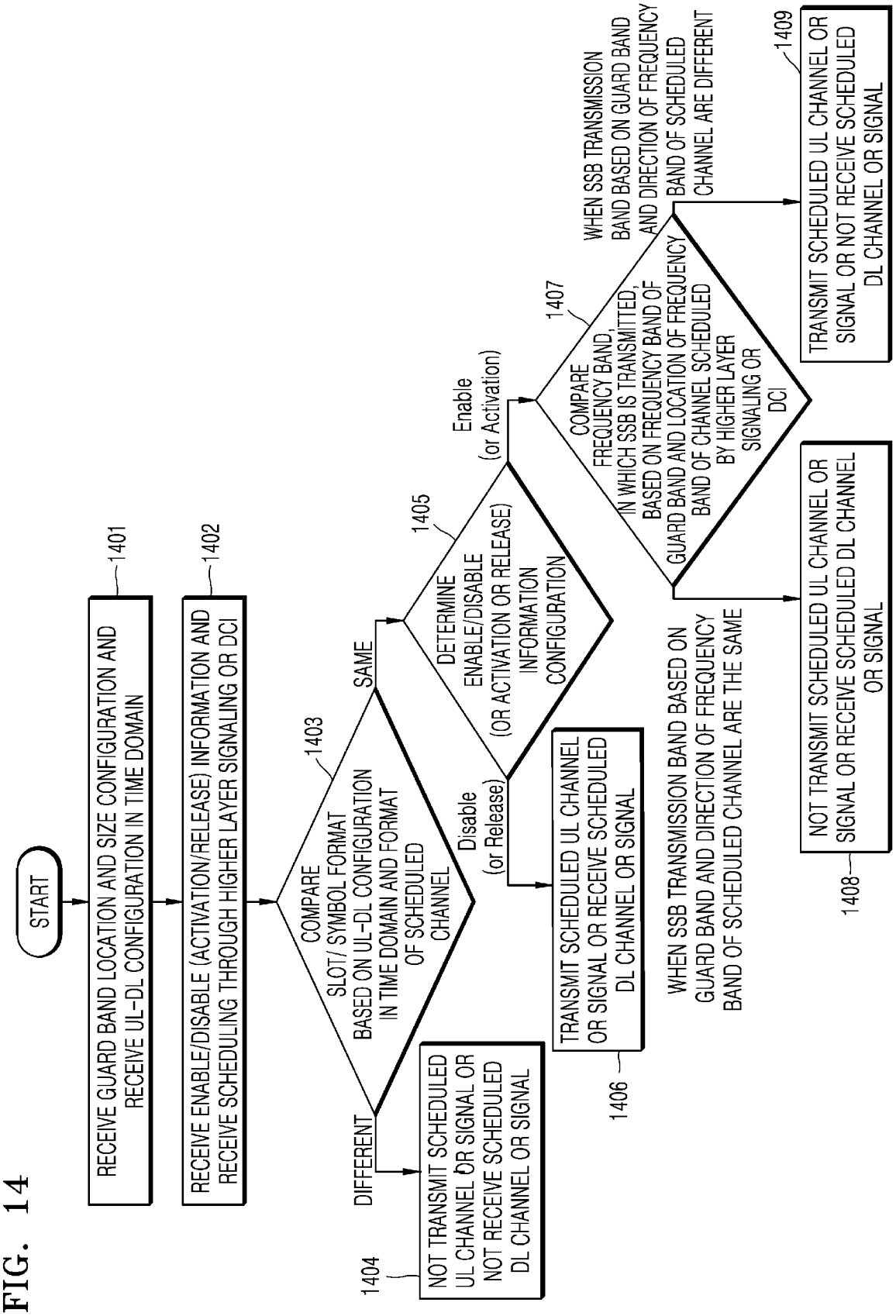
FIG. 14 is a diagram illustrating a method by which a UE determines whether to transmit a UL channel and signal, according to an embodiment of the disclosure.

FIG. 14 is a flowchart for describing operations of another method by which the UE is able to identify resource configurations in a frequency band, according to the second embodiment.

The UE may receive guard band location and size configuration information and a UL-DL configuration in the time domain in operation 1401. The UE may receive information for dynamically enabling or disabling or activating or releasing) the guard band and scheduling channel information through higher layer signaling or DCI, in operation 1402. Operations 1401 and 1402 are described sequentially for convenience of explanation, but may be performed at the same time or in a different order. The UE compares a slot/symbol format based on the UL-DL configuration in the time domain and a format of the configured or scheduled channel, in operation 1403. When the slot/symbol format based on the UL-DL configuration in the time domain is different from the format of the configured or scheduled channel in operation 1403, the UE does not perform transmission when the format of the configured or scheduled channel or signal is UL and does not perform reception when the format is DL in operation 1404. When the slot/symbol format based on the UL-DL configuration in the time domain is the same as the format of the configured or scheduled channel in operation 1403, the UE determines whether the guard band is dynamically enabled or disabled (or activated or released) in operation 1405. When the UE determines that the guard band is dynamically disabled (or released) in operation 1405, the UE performs transmission when the format of the configured or scheduled channel or signal is UL and performs reception when the format is DL in 1406. When the UE determines that the guard band is dynamically enabled (or activated) in operation 1405, the UE compares the frequency band, in which the SSB including the SIB information is transmitted, configured based on the frequency band of the guard band and a location of the channel configured or scheduled by higher layer signaling or DCI in operation 1407. When the frequency band, in which the SSB including the SIB information is transmitted, based on the frequency band of the guard band and the location of the channel or signal configured or scheduled through higher layer signaling or DCI are the same, the UE does not transmit the configured or scheduled UL channel or signal but receives the configured or scheduled DL channel or signal, in operation 1408. When the frequency band, in which the SSB including the SIB information is transmitted, based on the frequency band of the guard band is different from the location of the channel or signal configured or scheduled through higher layer signaling or DCI, the UE transmits the configured or scheduled UL channel or signal and does not receive the configured or scheduled DL channel or signal, in operation 1409.

Method 3

The UE may determine that a section including a frequency band in which a PRACH may be transmitted is configured as a UL resource. Specifically, a frequency band in which a PRACH may be transmitted is prevented from being included in the guard band and may always be considered as a UL resource because the BS needs to be always available for PRACH reception for UEs that make initial access thereto, the time of which may not be predicted. Hence, a section having higher frequencies may be separated from a section having lower frequencies based on the configured guard band, and the section included in the frequency band in which the PRACH may be transmitted may be determined as being configured for UL and the section not including the frequency band where the PRACH may be transmitted may be determined as being configured for DL.

Figure 15:
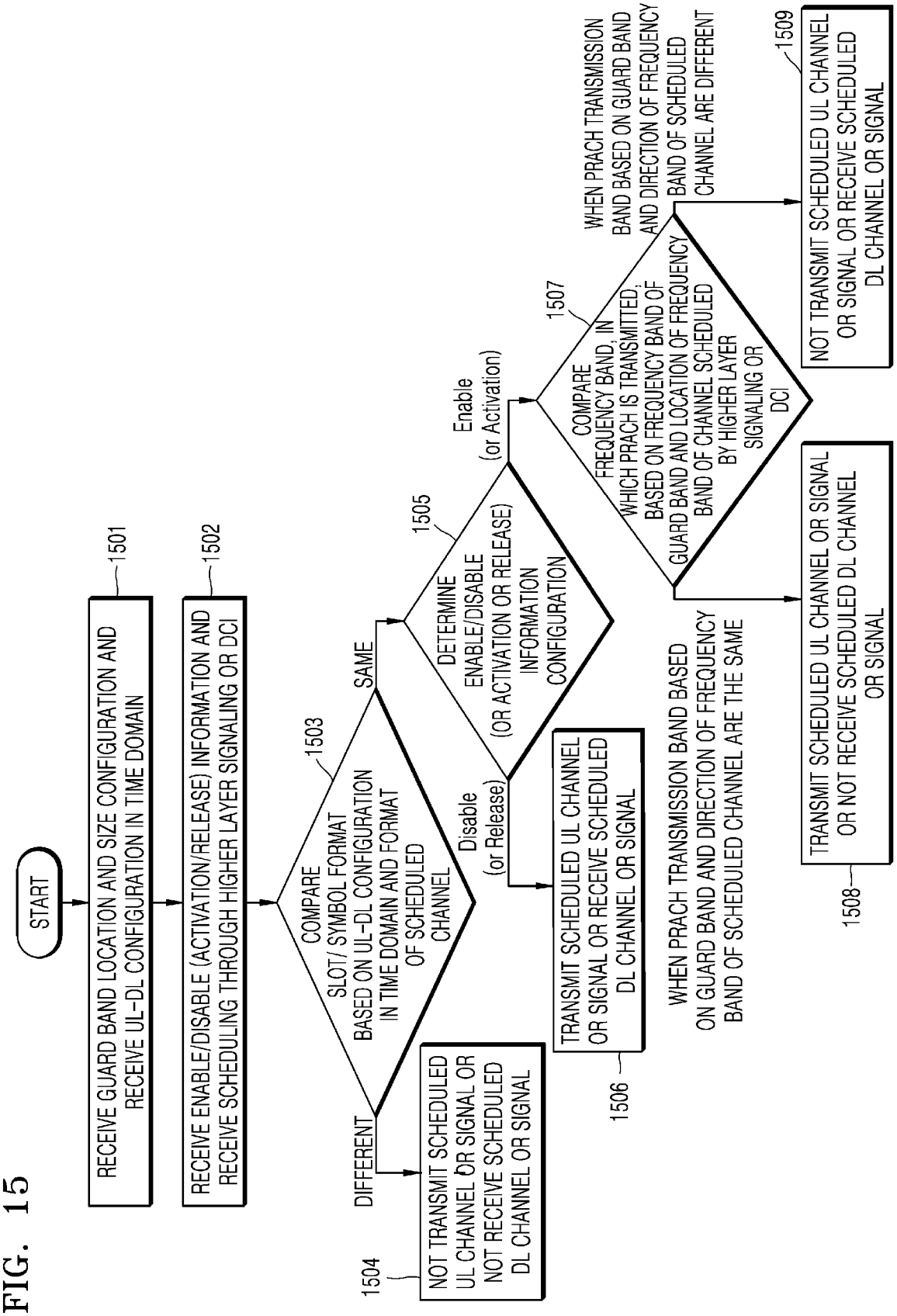
FIG. 15 is a diagram illustrating a method by which a UE determines whether to transmit another UL channel and signal, according to an embodiment of the disclosure.

FIG. 15 is a flowchart for describing operations of another method by which the UE is able to identify resource configurations in a frequency band, according to the second embodiment.

The UE may receive guard band location and size configuration information and a UL-DL configuration in the time domain in operation 1501. The UE may receive information for dynamically enabling or disabling or activating or releasing) the guard band and scheduling channel information through higher layer signaling or DCI, in operation 1502. Operations 1501 and 1502 are described sequentially for convenience of explanation, but may be performed at the same time or in a different order. The UE compares a slot/symbol format based on the UL-DL configuration in the time domain and a format of the configured or scheduled channel, in operation 1503. When the slot/symbol format based on the UL-DL configuration in the time domain is different from the format of the configured or scheduled channel in operation 1503, the UE does not perform transmission when the format of the configured or scheduled channel or signal is UL and does not perform reception when the format is DL in operation 1504. When the slot/symbol format based on the UL-DL configuration in the time domain is the same as the format of the configured or scheduled channel in operation 1503, the UE may determine whether the guard band is dynamically enabled or disabled (or activated or released) in operation 1505. When the UE determines that the guard band is dynamically disabled (or released) in operation 1505, the UE performs transmission when the format of the configured or scheduled channel or signal is UL and performs reception when the format is DL in 1506. When the UE determines that the guard band is dynamically enabled (or activated) in operation 1505, the UE compares the frequency band in which the PRACH is transmitted, configured based on the frequency band of the guard band and a location of the channel configured or scheduled by higher layer signaling or DCI in operation 1507. When the frequency band, in which the PRACH is transmitted, based on the frequency band of the guard band is the same as the location of the channel or signal configured or scheduled through higher layer signaling or DCI, the UE transmits the configured or scheduled UL channel or signal and does not receive the configured or scheduled DL channel or signal, in operation 1508. When the frequency band, in which the PRACH is transmitted, based on the frequency band of the guard band is different from the location of the channel or signal configured or scheduled through higher layer signaling or DCI, the UE does not transmit the configured or scheduled UL channel or signal but receives the configured or scheduled DL channel or signal, in operation 1509.

Method 4

The UE may be indicated about whether a higher (or lower or higher and lower) frequency band based on the guard band is for UL or DL, from the BS through higher layer signaling or L1 signaling. The UE may be indicated about whether the frequency band is for UL or DL from the BS with small overhead. Specifically, when a higher (or lower) section of the frequency band based on the guard band is indicated as UL, the UE transmits a configured or scheduled UL channel or signal and does not receive a configured or scheduled DL channel or signal. On the contrary, when a higher (or lower) section of the frequency band based on the guard band is indicated as DL, the UE does not transmit the configured or scheduled UL channel or signal but receives the configured or scheduled DL channel or signal.

The aforementioned methods 1, 2, 3, and 4 may be operated in combination.

Figure 16:
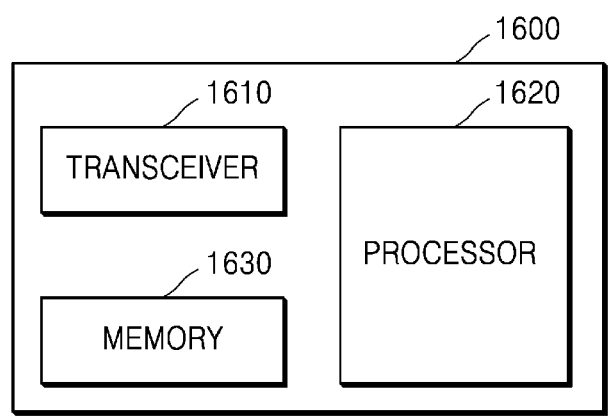
FIG. 16 is a block diagram of a UE, according to an embodiment of the disclosure.

FIG. 16 is a block diagram of a UE, according to an embodiment of the disclosure.

Referring to FIG. 16, a UE 1600 may include a transceiver 1610, a controller 1620, and a storage 1630. The transceiver 1610, the controller 1620, and the storage 1630 of the UE 1600 may operate according to a method of efficiently transmitting or receiving a channel and signal in the 5G communication system as described above in connection with the previous embodiments. The elements of the UE 1600 is not, however, limited thereto. For example, the UE 1600 may include more or fewer elements than described above. In addition, in a special occasion, the transceiver 1610, the controller 1620, and the storage 1630 may be implemented in the form of a single chip.

The transceiver 1610 may include a transmitter and a receiver in another embodiment. The transceiver 1610 may transmit or receive signals to or from a BS. The signals may include control information and data. For this, the transceiver 1610 may include an RF transmitter for up-converting the frequency of a signal to be transmitted and amplifying the signal and an RF receiver for low-noise amplifying a received signal and down-converting the frequency of the received signal. In addition, the transceiver 1610 may receive a signal on a wireless channel and output the signal to the controller 1620, or transmit a signal output from the controller 1620 on a wireless channel.

The controller 1620 may control a series of processes for the UE 1600 to be operated according to the embodiments of the disclosure. For example, the controller 1620 may perform at least one of a BWP-specific UL-DL configuration method, a method by which the UE is able to identify resource configurations in the frequency domain even when configured with UL-DL configurations only in the time domain, and a UL channel or signal transmission method and a DL channel or signal reception method in the UE. The storage 1630 may store control information or data such as UL-DL configuration information, guard band configuration information, etc., included in a signal obtained by the UE 1600, and have sectors for storing data required for control of the controller 1620 and data that occurs during the control in the controller 1620.

Figure 17:
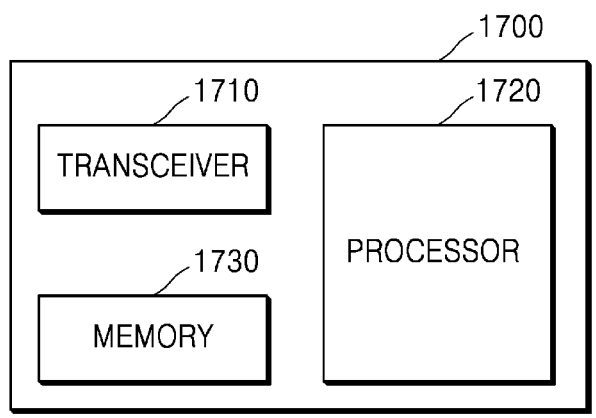
FIG. 17 is a block diagram of a base station (BS), according to an embodiment of the disclosure.

FIG. 17 is a block diagram of a BS, according to an embodiment.

Referring to FIG. 17, a BS 1700 may include a transceiver 1710, a controller 1720, and a storage 1730. The transceiver 1710, the controller 1720, and the storage 1730 of the BS 1700 may operate according to a method of efficiently transmitting or receiving a channel and signal in the 5G communication system as described above in connection with the previous embodiments. The elements of the BS 1700 is not, however, limited thereto. In another embodiment, the BS 1700 may include more or fewer elements than described above. In addition, in a special occasion, the transceiver 1710, the controller 1720, and the storage 1730 may be implemented in the form of a single chip. The transceiver 1710 may include a transmitter and a receiver in another embodiment. The transceiver 1710 may transmit or receive signals to or from a UE. The signals may include control information and data. For this, the transceiver 1710 may include an RF transmitter for up-converting the frequency of a signal to be transmitted and amplifying the signal and an RF receiver for low-noise amplifying a received signal and down-converting the frequency of the received signal. In addition, the transceiver 1710 may receive a signal on a wireless channel and output the signal to the controller 1720, or transmit a signal output from the controller 1720 on a wireless channel.

The controller 1720 may control a series of processes for the BS 1700 to be operated according to the embodiments of the disclosure. For example, the controller 1720 may perform at least one of a BWP-specific UL-DL configuration method, a method of identifying resource configurations in the frequency domain even when configured with UL-DL configurations only in the time domain, and a UL channel or signal reception method and a DL channel or signal transmission method in the BS.

The storage 1730 may store control information or data such as UL-DL configuration information, guard band configuration information, etc., determined by the BS 1700, or control information or data received from the UE, and have sectors for storing data required for control of the controller 1720 and data that occurs during the control in the controller 1720.

A method of configuring a BWP in a UE in a wireless communication system according to an embodiment may include obtaining system information including UL-DL configuration information; identifying a UL-DL pattern and reference subcarrier information based on the UL-DL configuration information; and determining a flexible symbol corresponding to a symbol not configured as UL or DL, based on a result of the identifying.

A method performed by a UE in a wireless communication system according to an embodiment may include receiving resource configuration information in a time domain for UL or DL in a plurality of BWPs from a BS; receiving information about an activated BWP from the BS; determining a UL resource or a DL resource in the time domain corresponding to the activated BWP based on the resource configuration information and the information about the activated BWP; and communicating with the BS based on the UL resource or the DL resource of the time domain corresponding to the activated BWP.

According to an embodiment, the activated BWP may include at least one BWP among the plurality of BWPs determined based on an amount of traffic or UL coverage.

According to an embodiment, the method may further include receiving information about a guard band for distinguishing between a UL resource and a DL resource in a frequency domain of the activated BWP from the BS.

According to an embodiment, the information about the guard band may indicate that the UL resource and the DL resource are present in a same time section in the frequency domain.

According to an embodiment, the communicating with the BS may include performing transmission of UL data or reception of DL data according to the received information about the guard band.

According to an embodiment, the performing of transmission of the UL data or reception of the DL data may include determining at least one of frequency bands, in which an SSB is transmitted, as a DL resource, when the guard band is present in the frequency domain.

According to an embodiment, the performing of the transmission of the UL data or the reception of the DL data may include determining at least one of frequency bands, in which a PRACH is transmitted, as a UL resource, when the guard band is present in the frequency domain.

According to an embodiment, the performing of the transmission of the UL data or the reception of the DL data may include determining at least one of frequency bands corresponding to an initial BWP as a DL resource, when the guard band is present in the frequency domain.

A method performed by a BS in a wireless communication system according to an embodiment may include transmitting resource configuration information in a time domain for UL or DL in a plurality of BWPs to a UE; transmitting information about an activated BWP to the UE; and communicating with the UE based on a UL resource or a DL resource in the time domain corresponding to the activated BWP determined according to the resource configuration information and the information about the activated BWP.

According to an embodiment, the activated BWP may include at least one BWP among the plurality of BWPs determined based on an amount of traffic or UL coverage.

According to an embodiment, the method may further include transmitting information about a guard band for distinguishing between a UL resource and a DL resource in a frequency domain of the activated BWP to the UE.

According to an embodiment, the information about the guard band may indicate that the UL resource and the DL resource are present in a same time section in the frequency domain.

According to an embodiment, the communicating with the UE may include performing reception of UL data or transmission of DL data according to the received information about the guard band.

According to an embodiment, at least one of frequency bands, in which an SSB is transmitted, may be determined as a DL resource, when the guard band is present in the frequency domain.

According to an embodiment, at least one of frequency bands, in which a PRACH is transmitted, may be determined as a UL resource, when the guard band is present in the frequency domain.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary.

The invention claimed is:

1. A method performed by a user equipment (UE) in a wireless communication system, the method comprising:
receiving, from a base station (BS), resource configuration information for uplink (UL) or downlink (DL) transmission in a plurality of bandwidth parts (BWPs), the resource configuration information indicating UL and DL resources configured per BWP in a time domain;
receiving, from the BS, information associated with an activated BWP;
determining frequency domain resource information corresponding to the activated BWP;
determining time domain resource information, based on the resource configuration information and the activated BWP, the time domain resource information including at least one UL resource and at least one DL resource configured for the activated BWP; and
communicating with the BS based on the time domain resource information and the frequency domain resource information.

2. The method of claim 1, wherein the activated BWP comprises:
at least one BWP among the plurality of BWPs determined based on an amount of traffic or UL coverage.

3. The method of claim 1, further comprising:
receiving information about a guard band for distinguishing between a UL resource and a DL resource in a frequency domain of the activated BWP from the BS.

4. The method of claim 3, wherein the information about the guard band indicates that the UL resource and the DL resource are present in a same time section in the frequency domain.

5. The method of claim 3, wherein the communicating with the BS comprises:
performing transmission of UL data or reception of DL data according to the received information about the guard band.

6. The method of claim 5, wherein the performing of transmission of the UL data or reception of the DL data comprises:
determining at least one of frequency bands, in which a synchronization signal block (SSB) is transmitted, as a DL resource, when the guard band is present in the frequency domain.

7. The method of claim 5, wherein the performing of transmission of the UL data or the reception of the DL data comprises:
determining at least one of frequency bands, in which a physical random access channel (PRACH) is transmitted, as a UL resource, when the guard band is present in the frequency domain.

8. The method of claim 5, wherein the performing of the transmission of the UL data or the reception of the DL data comprises:
determining at least one of frequency bands corresponding to an initial BWP as a DL resource, when the guard band is present in the frequency domain.

9. A method performed by a base station (BS) in a wireless communication system, the method comprising:
transmitting, to a user equipment (UE), resource configuration information for uplink (UL) or downlink (DL) transmission in a plurality of bandwidth parts (BWPs), the resource configuration information indicating UL and DL resources configured per BWP in a time domain;
transmitting, to the UE, information associated with an activated BWP; and communicating with the UE based on time domain resource information and frequency domain resource information, wherein the frequency domain resource information corresponds to the activated BWP, and wherein the time domain resource information is associated with the resource configuration information and the activated BWP, the time domain resource information including at least one UL resource and at least one DL resource configured for the activated BWP.

10. The method of claim 9, wherein the activated BWP comprises:

at least one BWP among the plurality of BWPs determined based on an amount of traffic or UL coverage.

11. The method of claim 9, further comprising:

transmitting information about a guard band for distinguishing between a UL resource and a DL resource in a frequency domain of the activated BWP to the UE.

12. The method of claim 11, wherein the information about the guard band indicates that the UL resource and the DL resource are present in a same time section in the frequency domain.

13. The method of claim 11, wherein the communicating with the UE comprises:

performing reception of UL data or transmission of DL data according to the information about the guard band.

14. The method of claim 13, wherein at least one of frequency bands, in which a synchronization signal block (SSB) is transmitted, is determined as a DL resource, when the guard band is present in the frequency domain.

15. The method of claim 13, wherein at least one of frequency bands, in which a physical random access channel (PRACH) is transmitted, is determined as a UL resource, when the guard band is present in the frequency domain.

\* \* \* \* \*